US011132091B2

(12) United States Patent
Kim

(10) Patent No.: US 11,132,091 B2
(45) Date of Patent: Sep. 28, 2021

(54) TOUCH DRIVING CIRCUIT

(71) Applicant: Samsung Display Co., Ltd., Yongin-si (KR)

(72) Inventor: Jeon Kyoo Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/827,482

(22) Filed: Mar. 23, 2020

(65) Prior Publication Data
US 2021/0041972 A1  Feb. 11, 2021

(30) Foreign Application Priority Data

Aug. 9, 2019 (KR) .................. 10-2019-0097664

(51) Int. Cl.
*G06F 3/044* (2006.01)
(52) U.S. Cl.
CPC .................. *G06F 3/044* (2013.01)
(58) Field of Classification Search
CPC ....................................... G06F 3/044
See application file for complete search history.

(56) References Cited

U.S. PATENT DOCUMENTS

| 9,857,914 B2* | 1/2018 | Kim | G06F 3/0443 |
| 9,965,081 B2* | 5/2018 | Park | G06F 3/0418 |
| 10,031,620 B2* | 7/2018 | Gicquel | G06F 3/044 |
| 10,156,935 B2* | 12/2018 | Lee | G06F 3/0446 |
| 10,282,044 B2* | 5/2019 | Min | G06F 3/04166 |
| 10,373,553 B2* | 8/2019 | Shin | G09G 3/3233 |
| 10,949,032 B2* | 3/2021 | Jiang | G06F 3/0446 |
| 2003/0205660 A1* | 11/2003 | Takahashi | H04N 5/3575 250/208.1 |
| 2005/0189952 A1* | 9/2005 | Ejima | G01D 5/2412 324/662 |
| 2006/0037393 A1* | 2/2006 | Itakura | G01N 27/223 73/335.04 |
| 2006/0164277 A1* | 7/2006 | Lee | H03K 4/50 341/155 |
| 2006/0186901 A1* | 8/2006 | Itakura | G01N 27/223 324/689 |
| 2009/0009486 A1* | 1/2009 | Sato | G02F 1/13338 345/174 |

(Continued)

FOREIGN PATENT DOCUMENTS

KR  10-2011-0091380 A  8/2011
KR  10-1091733 B1  12/2011

(Continued)

*Primary Examiner* — Amy Onyekaba
(74) *Attorney, Agent, or Firm* — Lewis Roca Rothgerber Christie LLP

(57) ABSTRACT

A touch driving circuit includes: a first sensing driver including a first sensing capacitor connected to a first touch electrode; a second sensing driver including a second sensing capacitor connected to a second touch electrode; and a touch sensing unit connected to the first and second sensing drivers to sense a voltage charged in each of the first and second sensing capacitors. A charging time point of the first sensing capacitor is different from a charging time point of the second sensing capacitor, and a discharging time point of the first sensing capacitor is different from a discharging time point of the second sensing capacitor.

21 Claims, 16 Drawing Sheets

(56) References Cited

U.S. PATENT DOCUMENTS

| | | | |
|---|---|---|---|
| 2011/0163768 A1* | 7/2011 | Kwon | G06F 3/0446 324/686 |
| 2011/0163994 A1* | 7/2011 | Tang | G06F 3/0446 345/174 |
| 2011/0187390 A1* | 8/2011 | Lin | G01R 27/26 324/679 |
| 2011/0261006 A1 | 10/2011 | Joharapurkar et al. | |
| 2011/0273192 A1* | 11/2011 | Huang | G06F 3/044 324/678 |
| 2011/0273400 A1* | 11/2011 | Kwon | G06F 3/04166 345/174 |
| 2013/0038570 A1* | 2/2013 | Seo | G06F 3/0416 345/174 |
| 2014/0002108 A1* | 1/2014 | Soo | H03K 17/9622 324/647 |
| 2014/0004905 A1* | 1/2014 | Soo | G06F 3/03 455/566 |
| 2014/0021966 A1* | 1/2014 | Shahrokhi | G01R 27/2605 324/679 |
| 2014/0253491 A1* | 9/2014 | Kwon | G06F 3/0446 345/174 |
| 2014/0333368 A1* | 11/2014 | Bell | G05F 3/262 327/517 |
| 2015/0028895 A1* | 1/2015 | Tseng | G06F 3/044 324/679 |
| 2015/0029141 A1* | 1/2015 | Jo | G06F 3/044 345/174 |
| 2015/0254491 A1* | 9/2015 | Mo | G06K 9/0002 345/174 |
| 2015/0261351 A1* | 9/2015 | Hung | G06F 3/0418 345/174 |
| 2015/0277660 A1* | 10/2015 | Yang | G06F 3/04182 345/173 |
| 2015/0338952 A1* | 11/2015 | Shahparnia | G06F 3/044 345/174 |
| 2016/0098117 A1* | 4/2016 | Ouh | G06F 3/0412 345/174 |
| 2016/0211858 A1* | 7/2016 | Kinyua | H03M 1/468 |
| 2016/0350577 A1* | 12/2016 | Yang | G06K 9/00053 |
| 2016/0370926 A1* | 12/2016 | Lee | G06F 3/04186 |
| 2017/0017348 A1* | 1/2017 | Ahn | G06F 3/04184 |
| 2017/0277931 A1* | 9/2017 | Uehara | G06F 3/044 |
| 2018/0004349 A1* | 1/2018 | Gicquel | G06F 3/044 |
| 2018/0088705 A1* | 3/2018 | Takahashi | G06F 3/04182 |
| 2018/0156853 A1* | 6/2018 | Kuang | G06F 3/04166 |
| 2018/0181230 A1* | 6/2018 | Chang | G09G 3/2092 |
| 2018/0188847 A1* | 7/2018 | Srivastava | G06F 3/0446 |
| 2018/0190197 A1* | 7/2018 | Chang | G09G 3/3233 |
| 2019/0096335 A1* | 3/2019 | Kim | G09G 3/3291 |
| 2019/0123756 A1* | 4/2019 | Huang | H03M 1/0695 |
| 2019/0180075 A1* | 6/2019 | Kim | H04N 5/3745 |
| 2019/0196618 A1* | 6/2019 | Lee | G06F 3/0412 |
| 2019/0204971 A1* | 7/2019 | Kang | G06F 3/04166 |
| 2019/0243493 A1* | 8/2019 | Ding | G06F 3/0412 |
| 2019/0278401 A1* | 9/2019 | Wang | H03K 17/962 |
| 2020/0057524 A1* | 2/2020 | Yang | G06F 3/044 |
| 2020/0110117 A1* | 4/2020 | Jiang | G06F 3/0416 |
| 2020/0183539 A1* | 6/2020 | Kang | G06F 3/04164 |
| 2020/0184175 A1* | 6/2020 | Suwald | G01R 27/2605 |
| 2020/0210046 A1* | 7/2020 | Lee | G06F 3/0445 |
| 2020/0220545 A1* | 7/2020 | Chang | G06F 3/044 |
| 2021/0034179 A1* | 2/2021 | Fan | G01R 27/2605 |

FOREIGN PATENT DOCUMENTS

| | | |
|---|---|---|
| KR | 10-2015-0080248 A | 7/2015 |
| KR | 10-1631376 B1 | 6/2016 |
| KR | 10-2017-0050952 A | 5/2017 |

\* cited by examiner

TOUCH DRIVING CIRCUIT

CROSS-REFERENCED TO RELATED APPLICATION

This application claims priority to and the benefit of Korean Patent Application No. 10-2019-0097664, filed on Aug. 9, 2019, in the Korean Intellectual Property Office, the disclosure of which is incorporated herein by reference in its entirety.

BACKGROUND

1. Field

Aspects of embodiments of the present invention relate to a touch driving circuit and a display device including the same.

2. Description of the Related Art

With the development of an information society, usages or requirements for display devices for displaying images have increased in various forms. For example, display devices are used in (or applied to) various electronic devices and appliances, for example, such as in smart phones, digital cameras, notebook computers, navigators, and smart televisions.

Recently, various input devices have been used to constitute an interface between a user and a home appliance (or various information communication devices). Accordingly, there may be increasing requirements for input devices that are convenient, simple, and that can reduce malfunctions. Accordingly, there has been proposed a touch screen device in which a user directly contacts a screen with a hand or a pen to input information. Because the touch screen device is an input device that can be easily used by anyone by simply touching buttons that are displayed on a display unit with a finger, the touch screen device is currently applied to various electronic appliances such as smart phones, tablet personal computers (PCs), portable multimedia players (PMPs), and other portable display devices.

The above information disclosed in this Background section is for enhancement of understanding of the background of the invention, and therefore, it may contain information that does not constitute prior art.

SUMMARY

One or more example embodiments of the present invention are directed to a touch driving circuit in which a user's touch performed in (e.g., received at) a plurality of touch electrodes is sensed through one terminal or pin of the touch driving circuit, and a display device including the touch driving circuit. Accordingly, the number of receiving terminals or receiving pins of the touch driving circuit may be reduced, and an area of the touch driving circuit that is mounted on a circuit board may be reduced.

However, aspects and features of the present invention are not restricted to those set forth herein. The above and other aspects and features of the present invention will become more apparent to one of ordinary skill in the art to which the present invention pertains from the detailed description of example embodiments of the present invention with reference to the accompanying drawings.

According to one or more example embodiments of the present invention, a touch driving circuit includes: a first sensing driver including a first sensing capacitor connected to a first touch electrode; a second sensing driver including a second sensing capacitor connected to a second touch electrode; and a touch sensing unit connected to the first and second sensing drivers to sense a voltage charged in each of the first and second sensing capacitors. A charging time point of the first sensing capacitor is different from a charging time point of the second sensing capacitor, and a discharging time point of the first sensing capacitor is different from a discharging time point of the second sensing capacitor.

In an embodiment, the touch sensing unit may include: an operational amplifier including a first input terminal connected to one end of each of the first and second sensing capacitors, a second input terminal that may be grounded, and an output terminal; a feedback capacitor connected between the first input terminal and the output terminal; and an initialization switch connected between the first input terminal and the output terminal.

In an embodiment, the initialization switch may be turned on during an initialization period to initialize the output terminal of the operational amplifier.

In an embodiment, the first sensing driver may further include: a first current source to charge a first node connected to an end of the first sensing capacitor; and a first charging switch to selectively connect the first current source and the first node to each other according to a ramp signal.

In an embodiment, the first sensing driver may further include a first discharging switch to discharge the first node according to a reset signal.

In an embodiment, the second sensing driver may further include a second charging switch to selectively supply a touch driving voltage to a second node connected to an end of the second sensing capacitor according to a reset signal.

In an embodiment, the second sensing driver may further include: a second current source to discharge the second node; and a second discharging switch to selectively connect the second node and the second current source to each other according to a ramp signal.

In an embodiment, the touch driving circuit may further include: an analog-digital converter to convert an output voltage of the touch sensing unit into touch raw data corresponding to digital data.

In an embodiment, a charging time point of the first sensing capacitor may be the same as a discharging time point of the second sensing capacitor, and a discharging time point of the first sensing capacitor may be the same as a charging time point of the second sensing capacitor.

In an embodiment, the first sensing capacitor may be charged according to a ramp signal, and the second sensing capacitor may be charged according to a reset signal.

In an embodiment, the first sensing capacitor may be discharged according to the reset signal, and the second sensing capacitor may be discharged according to the ramp signal.

According to one or more example embodiments of the present invention, a touch driving circuit includes: a first sensing driver including a first sensing capacitor connected to a first touch electrode, the first sensing capacitor to be charged during a first period; a second sensing driver including a second sensing capacitor connected to a second touch electrode, the second sensing capacitor to be charged during a second period subsequent to the first period; a touch sensing unit connected to the first and second sensing drivers to sense a voltage charged in each of the first and second sensing capacitors; and a deviation compensator to compare a first output of the touch sensing unit that is output during the first period with a second output of the touch sensing unit that is output during the second period to compensate for a deviation between the first output and the second output.

In an embodiment, the first sensing driver may further include: a first current source to charge a first node connected to the first sensing capacitor; a first charging switch to connect the first current source and the first node to each other during the first period; and a first discharging switch to discharge the first node during the second period.

In an embodiment, the second sensing driver may further include: a second charging switch to supply a touch driving voltage to a second node connected to the second sensing capacitor during the second period; a second current source to discharge the second node; and a second discharging switch to connect the second node and the second current source to each other during the first period.

In an embodiment, the deviation compensator may change a size of each of the first and second current sources when the first and second outputs are different from each other.

In an embodiment, each of the first and second current sources may include a current mirror including at least two transistors having gate terminals connected to each other.

In an embodiment, the deviation compensator may change a turn-on time of each of the first and second charging switches and the first and second discharging switches when the first and second outputs are different from each other.

In an embodiment, the deviation compensator may change a capacitance of each of the first and second sensing capacitors when the first and second outputs are different from each other.

In an embodiment, each of the first and second sensing capacitors may include at least two capacitors connected in parallel to each other.

In an embodiment, the second sensing driver may further include: a compensation capacitor including one end selectively connected to the second node, and another end that may be grounded; and a switch to selectively connect the compensation capacitor and the second node to each other.

In an embodiment, the deviation compensator may turn on the switch when the first and second outputs are different from each other.

BRIEF DESCRIPTION OF THE DRAWINGS

The above and other aspects and features of the present invention will become more apparent to those skilled in the art from the following detailed description of the exemplary embodiments thereof with reference to the attached drawings, in which.

DETAILED DESCRIPTION

Figure 1:
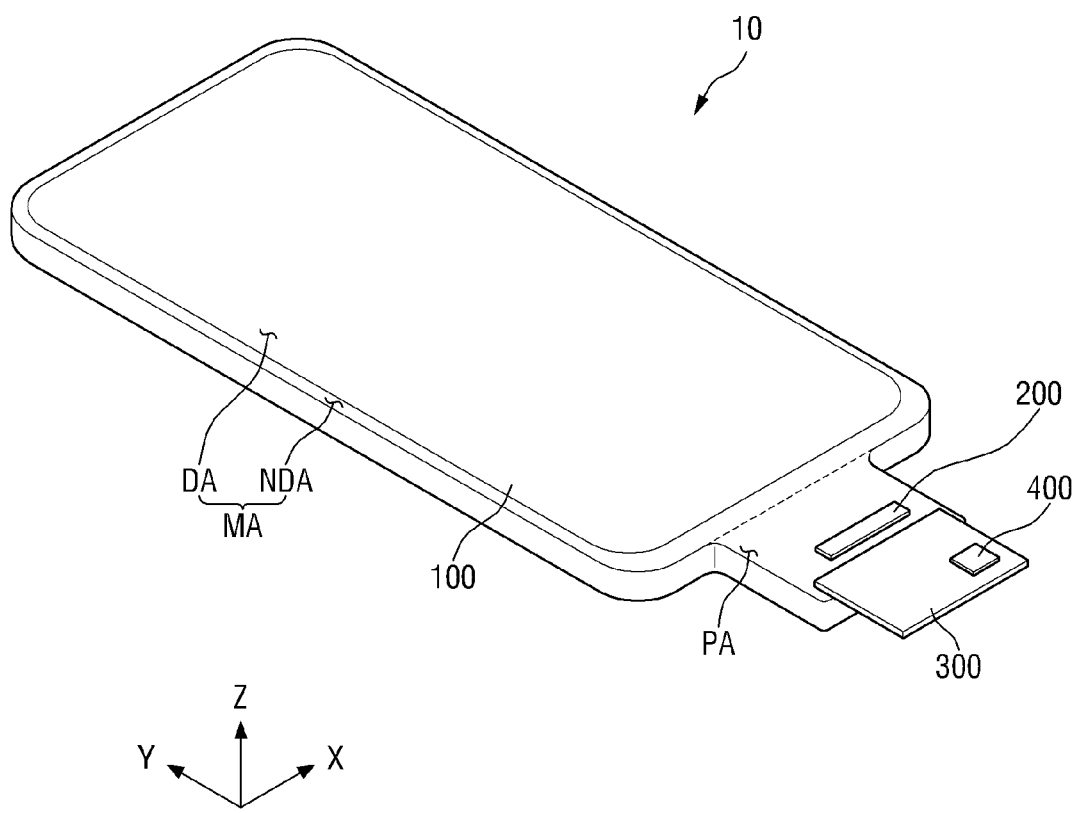
FIG. 1 is a perspective view of a display device according to an embodiment.

In the following description, for the purposes of explanation, numerous specific details are set forth in order to provide a thorough understanding of various exemplary embodiments and/or implementations of the invention. As used herein the terms "embodiments" and "implementations" may be interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different from each other, but may not be exclusive from each other. For example, various shapes, configurations, and characteristics of an exemplary embodiment may be used or implemented in another exemplary embodiment without departing from the spirit and scope of the inventive concepts.

Unless otherwise specified, the illustrated exemplary embodiments are to be understood as providing exemplary features of varying details of some example ways in which the inventive concepts may be implemented in practice. Therefore, unless otherwise specified, the features, components, modules, layers, films, panels, regions, aspects, and/or the like (hereinafter individually or collectively referred to as "elements") of the various exemplary embodiments may be otherwise combined, separated, interchanged, and/or rearranged without departing from the spirit and scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristics, attributes, properties, and/or the like of the elements, unless otherwise specified. Further, in the accompanying drawings, the size and relative sizes of elements may be exaggerated for clarity and/or for descriptive purposes. When an exemplary embodiment may be implemented differently, a specific process order may be performed differently from the described order. For example, two consecutively described processes may be performed at the same or substantially at the same time or may be performed in an order opposite to the described order. Also, like reference numerals denote like elements throughout the drawings.

When an element, such as a layer, is referred to as being "on," "connected to," or "coupled to" another element or layer, it may be directly on, connected to, or coupled to the other element or layer, or one or more intervening elements or layers may be present. However, when an element or layer is referred to as being "directly on," "directly connected to," or "directly coupled to" another element or layer, there are no intervening elements or layers present. To this end, the term "connected to" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for example, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the spirit and scope of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture, in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. As used herein, the terms "use," "using," and "used" may be considered synonymous with the terms "utilize," "utilizing," and "utilized," respectively. Also, the term "exemplary" is intended to refer to an example or illustration.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for example, manufacturing. In this manner, regions illustrated in the drawings may be schematic in nature, and the shapes of these regions may not reflect actual shapes of regions of a device, and thus, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions, and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts.

Unless otherwise defined, all terms (including technical and scientific terms) used herein have the same meaning as commonly understood by one of ordinary skill in the art to which the present invention belongs. Terms, such as those defined in commonly used dictionaries, should be interpreted as having a meaning that is consistent with their meaning in the context of the relevant art, and should not be interpreted in an idealized or overly formal sense, unless expressly so defined herein.

Figure 2:
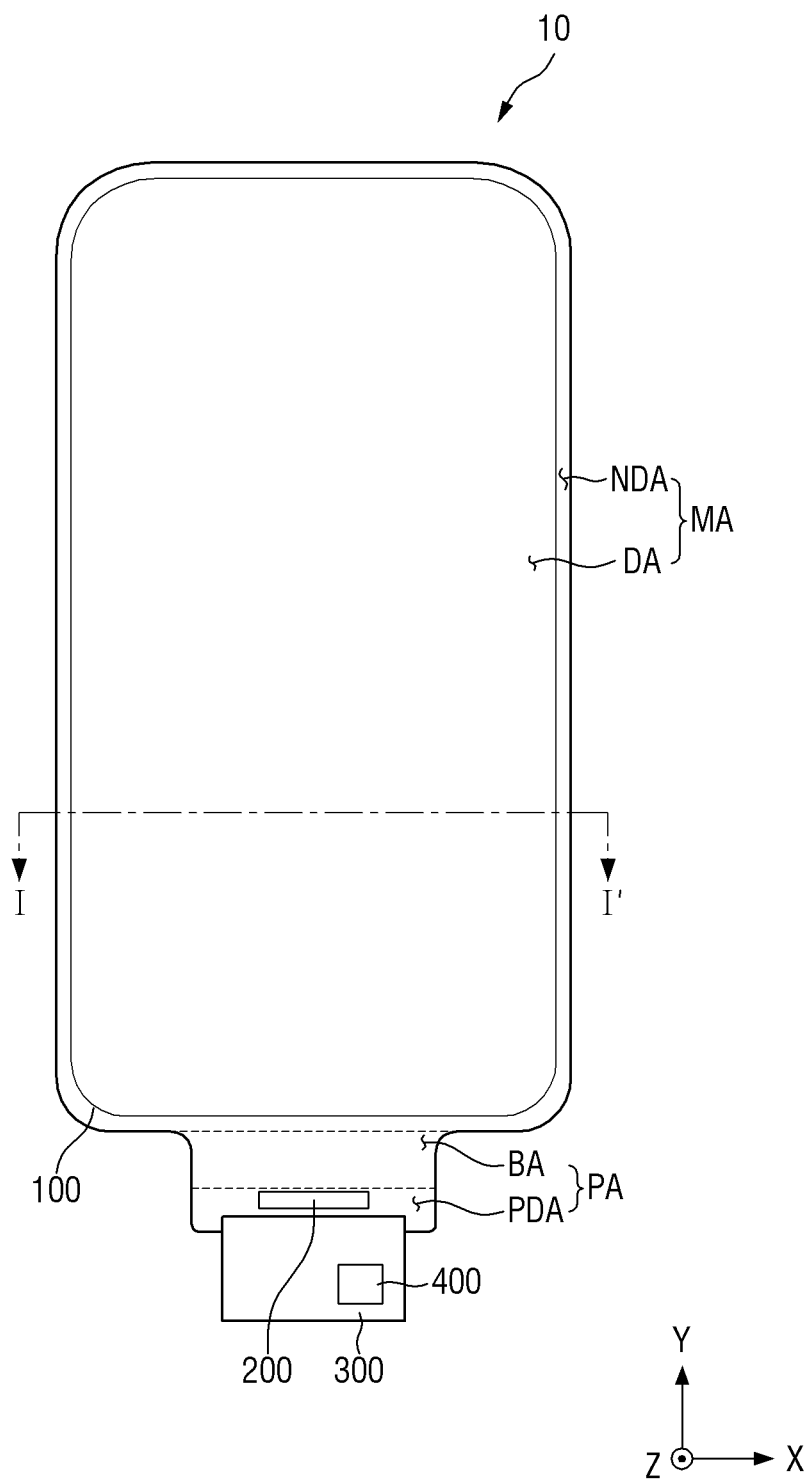
FIG. 2 is a plan view of the display device of FIG. 1.
Figure 3:
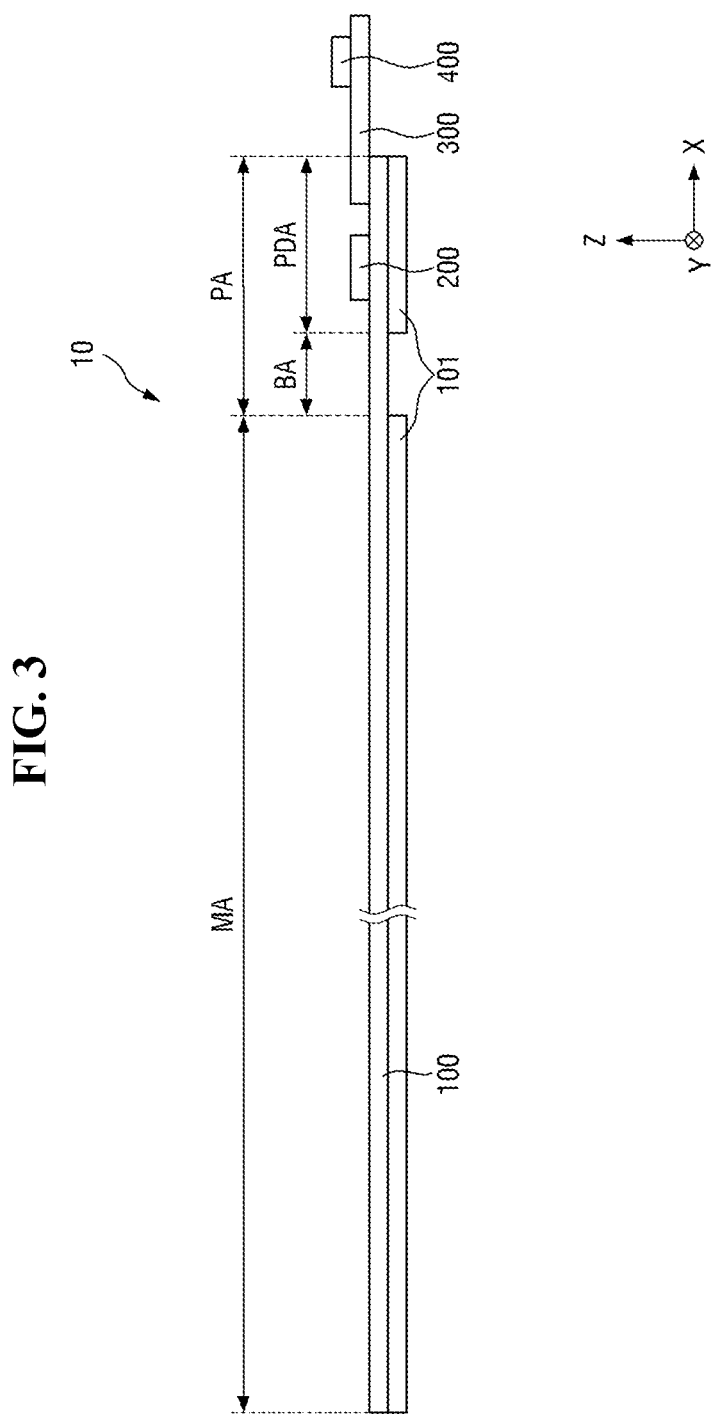
FIG. 3 is a side view of the display device of FIG. 1.
Figure 4:
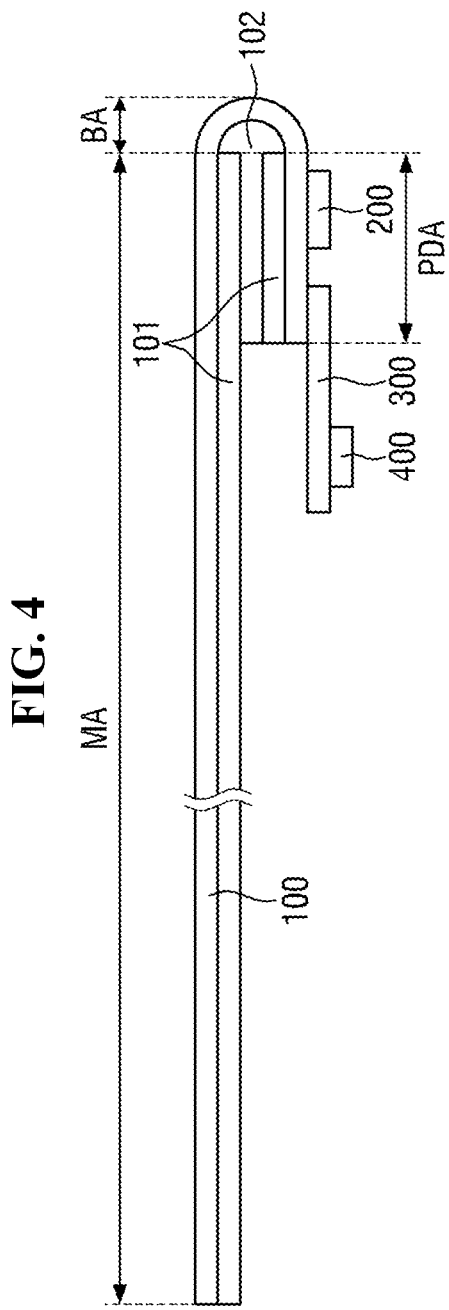
FIG. 4 is a side view of the display device of FIG. 3 showing a structure in which a bending region of the display device is bent.

FIG. 1 is a perspective view of a display device according to an embodiment. FIG. 2 is a plan view of the display device of FIG. 1. FIG. 3 is a side view of the display device of FIG. 1. FIG. 4 is a side view of the display device of FIG. 3 showing a structure in which a bending region of the display device is bent.

As used in this specification, the terms "on", "over", "top", "upper side", and "upper surface" refer to an upward direction with respect to the display device 10 (e.g., a Z-axis direction), and the terms "beneath", "under", "bottom", "lower side", and "lower surface" refer to a downward direction with respect to the display device 10 (e.g., a direction opposite to the Z-axis direction). Further, the terms "left", "right", "upper", and "lower" refer to directions when the display device 10 is viewed from a top plan view (e.g., a view from a plane that is parallel to or substantially parallel to (e.g., normal to) a top surface of the display device 10). For example, the term "left" refers to a direction opposite to the X-axis direction, the term "right" refers to the X-axis direction, the term "upper" refers to the Y-axis direction, and the term "lower" refers to a direction opposite to the Y-axis direction.

Referring to FIGS. 1 to 4, the display device 10 may be a device for displaying a moving image and/or a still image. The display device 10 may be used as a display screen for various suitable products, for example, such as televisions, notebooks, monitors, billboards, internets of things devices, and/or the like, as well as a display screen for various suitable portable electronic devices and appliances, for example, such as mobile phones, smart phones, tablet personal computers (PCs), smart watches, watch phones, mobile communication terminals, electronic notebooks, electronic books, portable multimedia players (PMPs), navigators, ultra-mobile PCS (UMPs), and/or the like. The display device 10 may be any suitable kind of display device, for example, such as a light emitting display device, a liquid crystal display device, a plasma display device, a field emission display device, an electrophoretic display device, an electrowetting display device, a quantum dot emission display device, a micro LED display device, and/or the like. Hereinafter, the display device 10 will be described as a light emitting display device for convenience, but the present invention is not limited thereto.

The display device 10, according to an embodiment, includes a display panel 100, a display driving circuit 200, a circuit board 300, and a touch driving circuit 400.

The display panel 100 may include a main area MA, and a protrusion area PA extending (e.g., protruding) from a side (e.g., from one side) of the main area MA. For example, in an embodiment, the protrusion area PA may be adjacent to a lower side (e.g., a side in the direction opposite to the Y-axis direction) of the main area MA, but the present invention is not limited thereto.

The main area MA may have a rectangular planar shape (e.g., a shape when viewed form the top plan view) having short sides extending in a first direction (e.g., the X-axis direction), and long sides extending in a second direction (e.g., the Y-axis direction). A corner where the short side extending in the first direction (e.g., the X-axis direction) is connected to (e.g., meets or contacts) the long side extending in the second direction (e.g., the Y-axis direction) may be formed to have a rounded shape having a curvature (e.g., having a predetermined curvature), or may be formed to have a right angle shape (or substantially a right angle shape). Here, the planar shape (e.g., a shape when viewed form the top plan view) of the display device 10 is not limited to a rectangular shape, and may be formed to include various suitable shapes, for example, such as another polygonal shape, a circular shape, an elliptical shape, and/or the like. The main area MA may be formed to be flat, but the present invention is not limited thereto, and the main area MA may include a curved portion formed at left and right ends thereof. In this case, the curved portion may have a constant curvature or a variable curvature.

The main area MA may include a display area DA where pixels are formed to display an image, and a non-display area NDA which may correspond to a peripheral area (e.g., a bezel area) of the display area DA. For example, the non-display area NDA may surround (e.g., around a periphery of) the display area DA.

The display area DA may include a plurality of pixels, scan lines and data lines connected to the plurality of pixels, and a power supply line. When the main area MA includes the curved portion, the display area DA may be disposed at (e.g., in or on) the curved portion. In this case, the image of the display panel 100 may also be displayed (e.g., may be seen) on the curved portion.

The non-display area NDA may be defined as an area that extends from the outside of the display area DA to an edge of the display panel 100. The non-display area NDA may include a scan driver for applying scan signals to the scan lines, and link lines for connecting the data lines to the display driving circuit 200.

The protrusion area PA may protrude from one side of the main area MA. As shown in FIG. 2, the protrusion area PA may protrude from the lower side of the main area MA. For example, a length of the protrusion area PA in the first direction (e.g., the X-axis direction) may be shorter than a length of the main area MA in the first direction (e.g., the X-axis direction).

The protrusion area PA may include a bending area BA and a pad area PDA. In this case, the pad area PDA may be disposed at one side of the bending area BA, and the main area MA may be disposed at the other side of the bending area BA. For example, the pad area PDA may be disposed at the lower side of the bending area BA, and the main area MA may be disposed at the upper side of the bending area BA. In other words, the bending area BA may be disposed between the main area MA and the pad area PDA along the second direction (e.g., the Y-axis direction or the direction opposite to the Y-axis direction).

The display panel 100 may be formed to be flexible such that the display panel 100 may be bendable, warpable, foldable, rollable, and/or the like. Therefore, the display panel 100 may be bent in a thickness direction (e.g., the Z-axis direction) at (e.g., in or on) the bending area BA. As shown in FIG. 3, one surface of the pad area PDA of the display panel 100 may face a direction (e.g., the Z-axis direction) corresponding to a front side of the display panel 100 before the display panel 100 is bent. As shown in FIG. 4, the one surface of the pad area PDA of the display panel 100 may face an opposite direction (e.g., the direction opposite the Z-axis direction) corresponding to a rear side of the display panel 100 after the display panel 100 is bent. Thus, because the pad area PDA of the bent display panel 100 is disposed under the main area MA, the pad area PDA may overlap with the main area MA when the display panel 100 is bent.

The pad area PDA of the display panel 100 may include (e.g., may be provided with) the display driving circuit 200, and pads electrically connected to the circuit board 300.

A panel lower cover 101 may be disposed under the display panel 100. The panel lower cover 101 may be connected (e.g., may be attached) to the lower surface of the display panel 100 through an adhesive member. For example, the adhesive member may include (or may be) a pressure sensitive adhesive (PSA).

According to an embodiment, the panel lower cover 101 may include a light absorbing member for absorbing light that is incident from the outside, a buffer member for absorbing shock from the outside, and a heat radiation member for radiating heat (e.g., efficiently radiating heat) from the display panel 100.

The light absorbing member may be disposed under the display panel 100. The light absorbing member may block transmission of light to prevent or substantially prevent components that are disposed under the light absorbing member, for example, the circuit board 300 and/or the like, from being seen from above the display panel 100. For example, the light absorbing member may include a light absorbing material such as a black pigment, a black dye, and/or the like.

The buffer member may be disposed under the light absorbing member. The buffer member may absorb an external shock to prevent or substantially prevent the display panel 100 from being damaged. For example, the buffer member may include (or may be formed of) a polymer resin such as polyurethane, polycarbonate, polyethylene, polypropylene, and/or the like, or may include an elastic material such as a sponge that is obtained (e.g., that is formed) by foam-molding a rubber, a urethane-based material, an acryl-based material, and/or the like. The buffer member may function as a cushion layer.

The heat radiation member may be disposed under the buffer member. The heat radiation member may include a first heat radiation layer including graphite or carbon nanotubes, and a second heat radiation layer including (e.g., formed of) a metal thin film including a metal, for example, such as copper, nickel, ferrite, silver, and/or the like, which can block electromagnetic waves and may have a suitable (e.g., excellent) thermal conductivity.

As shown in FIG. 3, the panel lower cover 101 may not be disposed at (e.g., in or on) the bending area BA of the display panel 100, such that the display panel 100 (e.g., the bending area BA) may be bent (e.g., may be easily bent). When the display panel 100 is bent at (e.g., in) the bending area BA, the pad area PDA may overlap with the main area MA, because the pad area PDA is disposed under the main area MA. The panel lower cover 101 disposed at (e.g., in or on) the main area MA of the display panel 100 may be connected to (e.g., attached to) the panel lower cover 101 disposed at (e.g., in or on) the pad area PDA of the display panel 100 by an adhesive member 102. The adhesive member 102 may include (or may be) a pressure sensitive adhesive.

The display driving circuit 200 may output signals and voltages for driving the display panel 100. For example, the display driving circuit 200 may supply a data voltage to a data line. In addition, the display driving circuit 200 may supply a power supply voltage to a power supply line, and may supply a scan control signal to a scan driver. The display driving circuit 200 may be formed as an integrated circuit (IC), and may be disposed at (e.g., in or on) the pad area PDA on the display panel 100 by a chip on glass (COG) method, a chip on plastic (COP) method, an ultrasonic bonding method, and/or the like. However, the present invention is not limited thereto. As another example, the display driving circuit 200 may be mounted on the circuit board 300.

The pads may include display pads electrically connected to the display driving circuit 200, and touch pads electrically connected to touch lines.

The circuit board 300 may be connected to (e.g., attached onto) the pads using an anisotropic conductive film (ACF). Lead lines of the circuit board 300 may be electrically connected to the pads of the display panel 100. For example, the circuit board 300 may include (or may be) a flexible printed circuit board (FPCB), a printed circuit board (PCB), or a flexible film, for example, such as a chip on film (COF).

The touch driving circuit 400 may be connected to touch electrodes of a touch sensing layer TSL of the display panel 100. The touch driving circuit 400 may measure a change in capacitance of the touch electrodes of the touch sensing layer TSL. The touch driving circuit 400 may determine a user's touch and a user's touch position according to (e.g., based on) the change in capacitance of the touch electrodes. As used herein, the user's touch refers to an object, for example, such as a user's finger or a pen, that contacts (e.g., that directly contacts) a surface (e.g., one surface) of the display device 10 disposed on the touch sensing layer TSL. The touch driving circuit 400 may determine the user's touch position by distinguishing a portion from among the plurality of touch electrodes where a user touch occurs from a portion from among the plurality of touch electrodes where the user touch does not occur.

The touch driving circuit 400 may be disposed on the circuit board 300. For example, the touch driving circuit 400 may be formed as an integrated circuit (IC), may be mounted on the circuit board 300, and may be electrically connected to the pads of the display panel 100 through the lead lines.

Figure 5:
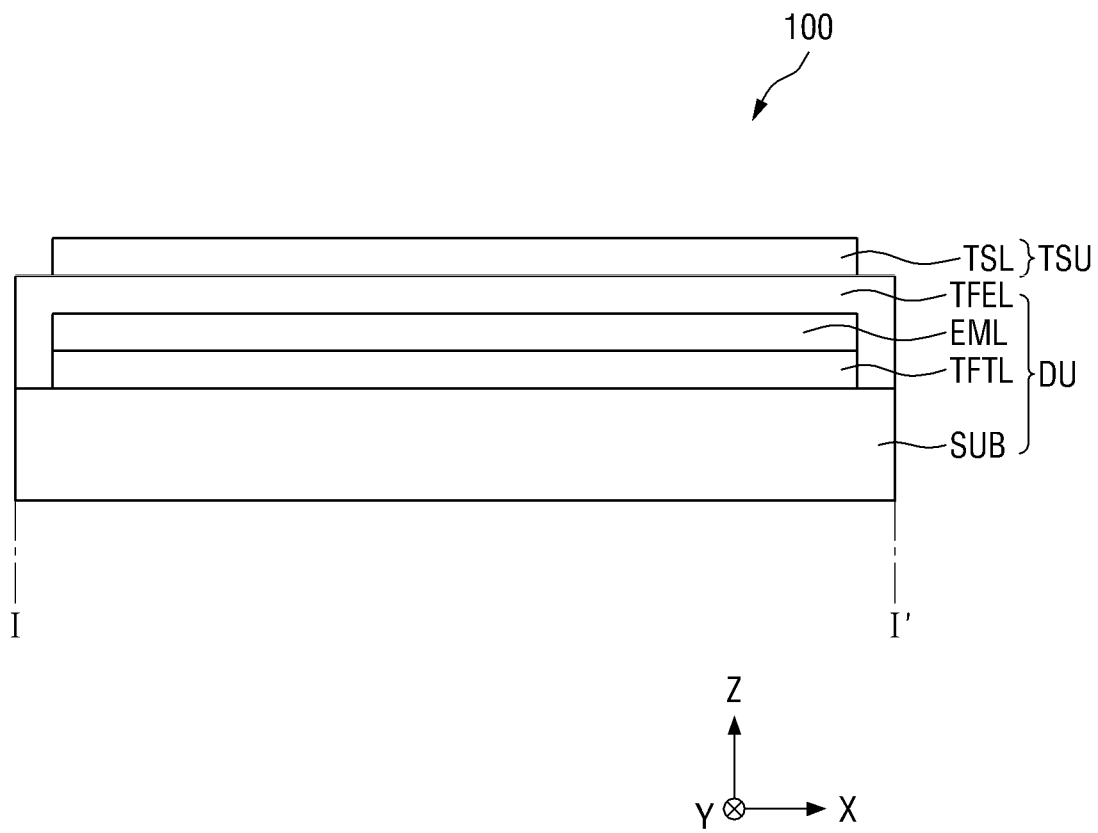
FIG. 5 is a cross-sectional view taken along the line I-I' of FIG. 2.

FIG. 5 is a cross-sectional view taken along the line I-I' of FIG. 2.

Referring to FIG. 5, the display panel 100 may include a display unit (e.g., a display or a display part) DU and a touch sensing unit (e.g., a touch sensor or a touch sensing part) TSU.

The display unit DU may include a substrate SUB, a thin film transistor layer TFTL disposed on the substrate SUB, a light emitting element layer EML disposed on the thin film transistor layer TFTL, and a thin film encapsulation layer TFEL covering the thin film transistor layer TFTL and the light emitting element layer EML.

The substrate SUB may include an insulating material, for example, such as glass, quartz, a polymer resin, and/or the like. Examples of the polymer resin may include polyethersulphone (PES), polyacrylate (PA), polyarylate (PAR), polyetherimide (PEI), polyethylene napthalate (PEN), polyethylene terepthalate (PET), polyphenylene sulfide (PPS), polyallylate, polyimide (PI), polycarbonate (PC), cellulose triacetate (CAT), cellulose acetate propionate (CAP), and combinations thereof. In another embodiment, the substrate SUB may include a metal material.

The substrate SUB may be a rigid substrate, or a flexible substrate that is bendable, foldable, rollable, and/or the like. When the substrate SUB is a flexible substrate, the substrate SUB may include (or may be formed of) polyimide (PI), but the present invention is not limited thereto.

Figure 6:
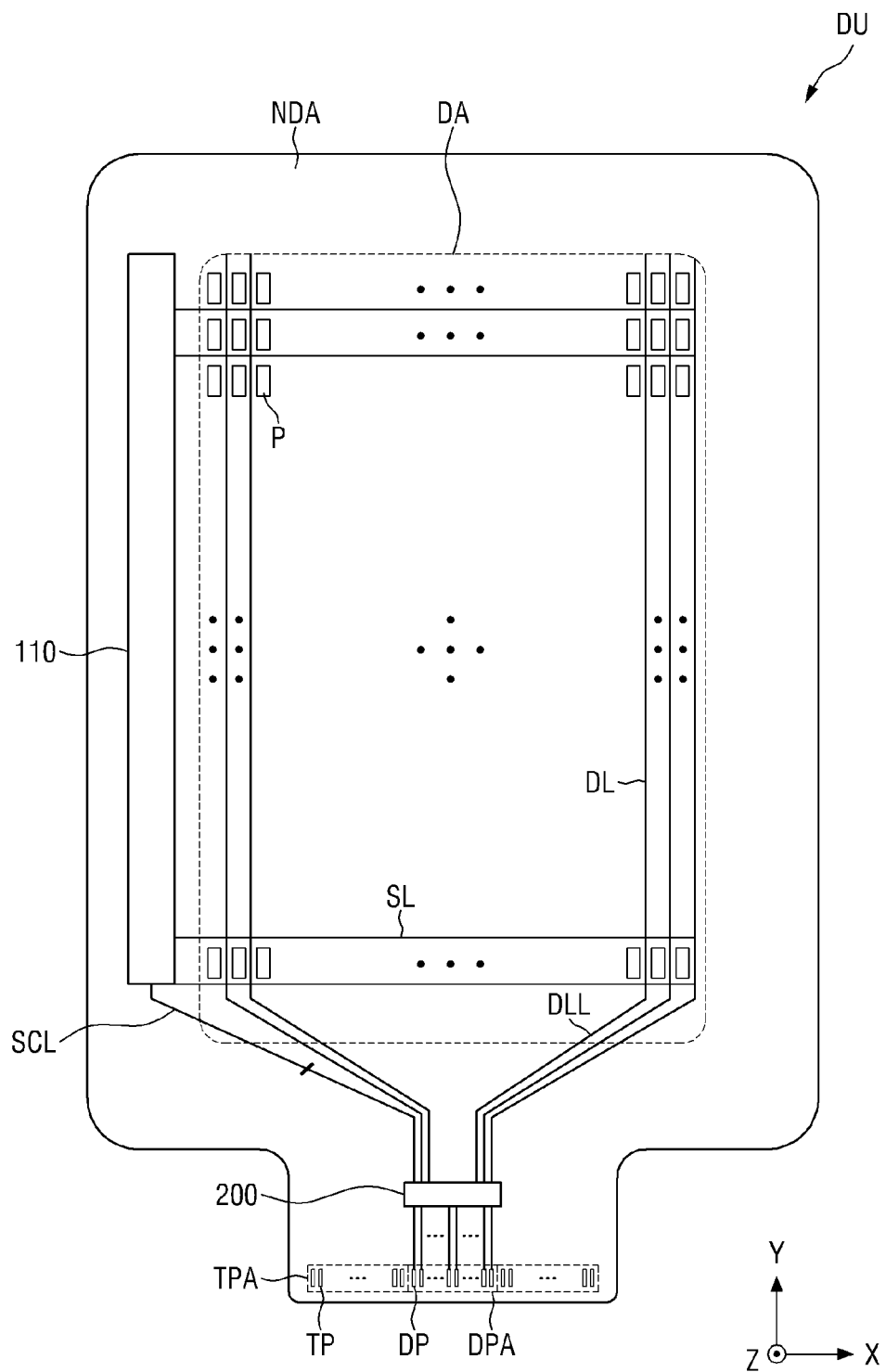
FIG. 6 is a plan view showing a configuration associated with the display unit of FIG. 5.

The thin film transistor layer TFTL may be disposed on the substrate SUB. The thin film transistor layer TFTL may include (e.g., may be provided with) thin film transistors of each pixel, scan lines, data lines, power supply lines, scan control lines, and routing lines for connecting the pads and the data lines. Each of the thin film transistors may include a gate electrode, a semiconductor layer, a source electrode, and a drain electrode. When a scan driver 110 is formed at (e.g., in or on) the non-display area NDA of the display panel 100 as shown in FIG. 6, the scan driver 110 may include thin film transistors.

The thin film transistor layer TFTL may be disposed at (e.g., in or on) the display area DA and the non-display area NDA. For example, the thin film transistors, the scan lines, the data lines, and the power supply lines of each pixel of the thin film transistor layer TFTL may be disposed at (e.g., in or on) the display area DA. Further, scan control lines and link lines of the thin film transistor layer TFTL may be disposed at (e.g., in or on) the non-display area NDA.

The light emitting element layer EML may be disposed on the thin film transistor layer TFTL. The light emitting element layer EML may include a plurality of pixels, each of the pixels including a first electrode, a light emitting layer, and a second electrode, and a pixel defining film defining the pixels. For example, the light emitting layer may include (or may be) an organic light emitting layer including an organic material. In this case, the light emitting layer may include a hole transporting layer, an organic light emitting layer, and an electron transporting layer. For example, the first electrode may receive a desired or a suitable voltage (e.g., a predetermined voltage) through the thin film transistor of the thin film transistor layer TFTL, and the second electrode may receive a cathode voltage. As such, when each of the first and second electrodes receives a desired or a suitable voltage (e.g., a predetermined voltage), holes and electrons are transferred to the organic light emitting layer through the hole transporting layer and the electron transporting layer, respectively, and are combined with each other to emit light.

The thin film encapsulation layer TFEL may be disposed on the light emitting element layer EML to cover the thin film transistor layer TFTL and the light emitting element layer EML. In some embodiments, the thin film encapsulation layer TFEL may prevent or substantially prevent oxygen or moisture from penetrating into the light emitting element layer EML. Accordingly, the thin film encapsulation layer TFEL may include at least one inorganic film. For example, the inorganic film may include (or may be) a silicon nitride layer, a silicon oxynitride layer, a silicon oxide layer, a titanium oxide layer, and/or an aluminum oxide layer, but the present invention is not limited thereto. In some embodiments, the thin film encapsulation layer TFEL may further protect or substantially protect the light emitting element layer EML from foreign matter, for example, such as dust. Accordingly, the thin film encapsulation layer TFEL may include at least one organic film. For example, the organic film may include an acrylic resin, an epoxy resin, a phenolic resin, a polyamide resin, and/or a polyimide resin, but the present invention is not limited thereto.

The thin film encapsulation layer TFEL may be disposed at (e.g., in or on) both the display area DA and the non-display area NDA. In more detail, the thin film encapsulation layer TFEL may be disposed to cover the light emitting element layer EML at (e.g., in or on) the display area DA and the non-display area NDA, and to cover the thin film transistor layer TFTL at (e.g., in or on) the non-display area NDA.

The touch sensing unit TSU may include a touch sensing layer TSL.

The touch sensing layer TSL may be disposed on the thin film encapsulation layer TFEL. For example, in some embodiments, the touch sensing layer TSL may be disposed directly on the thin film encapsulation layer TFEL. In this case, because the touch sensing layer TSL is disposed directly on the thin film encapsulation layer TFEL, the thickness of the display device 10 may be reduced when compared to a display device including a separate touch panel including the touch sensing layer TSL that is attached onto the thin film encapsulation layer TFEL.

Figure 7:
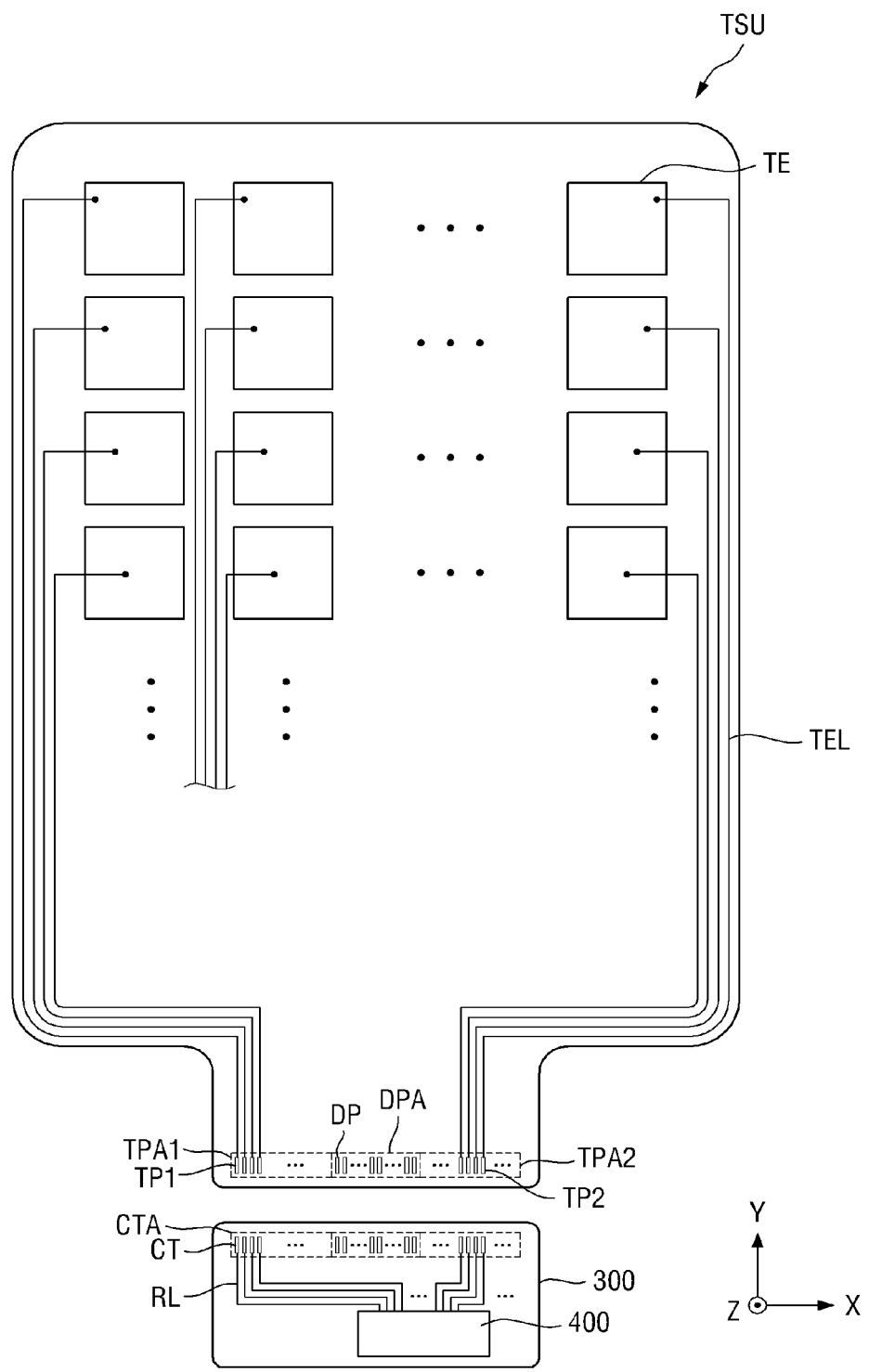
FIG. 7 is a plan view showing a configuration associated with the touch sensing unit of FIG. 5.

The touch sensing layer TSL may include touch electrodes for sensing a user's touch by a capacitance method (e.g., a self-capacitance method), and touch electrode lines for connecting the touch electrodes and the pads. The touch electrodes of the touch sensing layer TSL may be arranged at (e.g., in or on) a touch sensing area overlapping with the display area DA. As shown in FIG. 7, the touch electrode lines TEL of the touch sensing layer TSL may connect the touch electrodes TE to the touch pads TP (e.g., TP1 and TP2) overlapping with the non-display area NDA.

According to an embodiment, the display panel 100 may further include a polarizing film disposed on the touch sensing layer TSL. The polarizing film may include a phase retardation film, for example, such as a linear polarizing plate and a quarter-wave plate. In this case, the phase retardation film may be disposed on the touch sensing layer TSL, and the linear polarizing plate may be disposed on the phase retardation film. The display panel 100 may further include a cover window disposed on the polarizing film. The cover window may be connected to (e.g., attached onto) the polarizing film by a transparent adhesive member, for example, such as an optically clear adhesive (OCA) film.

FIG. 6 is a plan view showing a configuration associated with the display unit of FIG. 5.

Referring to FIG. 6, a plurality of pixels P, scan lines SL, and data lines DL may be arranged at (e.g., in or on) the display area DA. The scan lines SL may be connected to the scan driver 110, may extend in a first direction (e.g., in the X-axis direction), and may be arranged in parallel to each other along a second direction (e.g., along the Y-axis direction) crossing the first direction (e.g., the X-axis direction). The data lines DL may be connected to the display driving circuit 200, may extend in the second direction (e.g., in the Y-axis direction), and may be arranged in parallel to each other along the first direction (e.g., along the X-axis direction).

Each of the pixels P may be connected to at least one of the scan lines SL and to one of the data lines DL. Each of the pixels P may include a plurality of thin film transistors including a driving transistor and at least one switching transistor, a light emitting diode, and a capacitor. When each of the pixels P receives a scan signal from a corresponding scan line SL, the pixels P may receive a data voltage from a corresponding data line DL, and may supply a driving current to a light emitting diode in response to the data voltage applied to a gate electrode (e.g., of the driving transistor) to emit light. While the light emitting element is described as being an organic light emitting element including an anode electrode, an organic light emitting layer, and a cathode, the present invention is not limited thereto. For example, the light emitting element may be implemented as a quantum dot light emitting element including an anode electrode, a quantum dot light emitting layer, and a cathode electrode, an inorganic light emitting element including an anode electrode, an inorganic light emitting layer including an inorganic semiconductor, and a cathode electrode, or a micro light emitting element including a micro light emitting diode.

The scan driver 110 may be disposed at a side (e.g., at one side) of the display panel 100, and may be connected to the display driving circuit 200 through one or more scan control lines (e.g., through a plurality of scan control lines) SCL. The scan driver 110 may receive a scan control signal from the display driving circuit 200. The scan driver 110 may generate scan signals according to the scan control signal, and may supply the scan signals to the scan lines SL.

Although it is shown in FIG. 6 that the scan driver 110 is formed at (e.g., in or on) the non-display area NDA adjacent to the left side of the display area DA, the present invention is not limited thereto. For example, the scan driver 110 may be formed at (e.g., in or on) the non-display area NDA adjacent to the right side of the display area DA. In another example, the scan driver 110 may be formed at (e.g., in or on) the non-display area NDA adjacent to both the left side and the right side of the display area DA. In this case, for example, the scan driver 110 may include a first scan driver disposed at (e.g., in or on) the non-display area NDA adjacent to the left side of the display area DA, and a second scan driver disposed at (e.g., in or on) the non-display area NDA adjacent to the right side of the display area DA.

The display driving circuit 200 is connected to a plurality of display pads DP to receive video data (e.g., digital video data) and timing signals. The display driving circuit 200 converts the video data into data voltages (e.g., converts the digital video data into analog positive/negative data voltages), and supplies the data voltages (e.g., the analog positive/negative data voltages) to the data lines DL through a plurality of fan-out lines DLL. The display driver circuit 200 may control the scan driver 110 by generating a scan control signal, and supplying the scan control signal to the scan driver 110 through the one or more scan control lines (e.g., through the plurality of scan control lines) SCL. The scan driver 110 may supply the scan signals to each of the plurality of pixels P according to (e.g., based on) the scan control signal to select the pixels P to which the data voltages are to be supplied, so that the selected pixels P may receive a corresponding data voltage (e.g., from a corresponding data line DL). The display driving circuit 200 may be formed as an integrated circuit (IC), and may be connected to (e.g., attached onto) the substrate SUB by a chip on glass (COG) method, a chip on plastic method, an ultrasonic bonding method, and/or the like. However, the present invention is not limited thereto. For example, the display driving circuit 200 may be mounted on the circuit board 300.

The display panel 100 may include display pads DP electrically connected to the display driving circuit 200, and touch pads TP electrically connected to the touch electrode lines. For example, the display pad area DPA may be disposed at a center (or a central area) of an end (e.g., of one end) of the protrusion area PA, and the touch pad area TPA may be disposed at respective sides (e.g., at both sides or at left and right sides) of the display pad area DPA at the one end of the protrusion area PA.

FIG. 7 is a plan view showing a configuration associated with the touch sensing unit of FIG. 5.

Referring to FIG. 7, the touch sensing layer TSL of the touch sensing unit TSU may include a plurality of touch electrodes TE, and the plurality of touch electrodes TE may be disposed to overlap with the plurality of pixels P of the display panel 100. For example, the plurality of touch electrodes TE may be arranged to overlap with the display area DA (e.g., to overlap with an entirety of the display area DA) of the display panel 100, and thus, a user's touch received (e.g., occurring) on the surface of the display device 10 of the display panel 100 may be sensed. For example, a size of the touch electrode TE may be set in consideration of a contact area of a finger, a contact area of a pen, and/or the like.

The plurality of touch electrodes TE may be connected to the touch driving circuit 400 through the plurality of touch electrode lines TEL. For example, one end of each of the plurality of touch electrode lines TEL may be connected to a corresponding touch electrode TE, and the other end of each of the plurality of touch electrode lines TEL may be connected to a corresponding touch pad TP (e.g., TP1 and TP2). The touch pads TP (e.g., TP1 and TP2) of the display panel 100 may be connected to connection terminals CT disposed at (e.g., in or on) a connection terminal area CTA of the circuit board 300. Each of the plurality of connection terminals CT of the circuit board 300 may be connected to the touch driving circuit 400 through the lead line (e.g., through a corresponding lead line) RL. Accordingly, each of the plurality of touch electrodes TE may be connected to the touch driving circuit 400 through the touch electrode line TEL, the touch pad TP, the connection terminal CT, and the lead line RL.

For example, each of the plurality of touch electrodes TE may receive a touch driving voltage, and each of the plurality of touch electrodes TE may form a capacitance (e.g., a predetermined capacitance) together with the electrodes, driving lines, and/or signal lines of the display unit DU. In this case, when a user's touch is received at (e.g., occurs on) the plurality of touch electrodes TE, an additional capacitance is generated between the plurality of touch electrodes TE and the user's touch (e.g., the user's finger, the pen, and/or the like), and thus, the capacitance of the plurality of touch electrodes may be changed. Similarly, the touch driving circuit 400 may sense a change in capacitance formed in each of the plurality of touch electrodes TE, thereby sensing the occurrence of a user's touch and the position of the user's touch.

Figure 8:
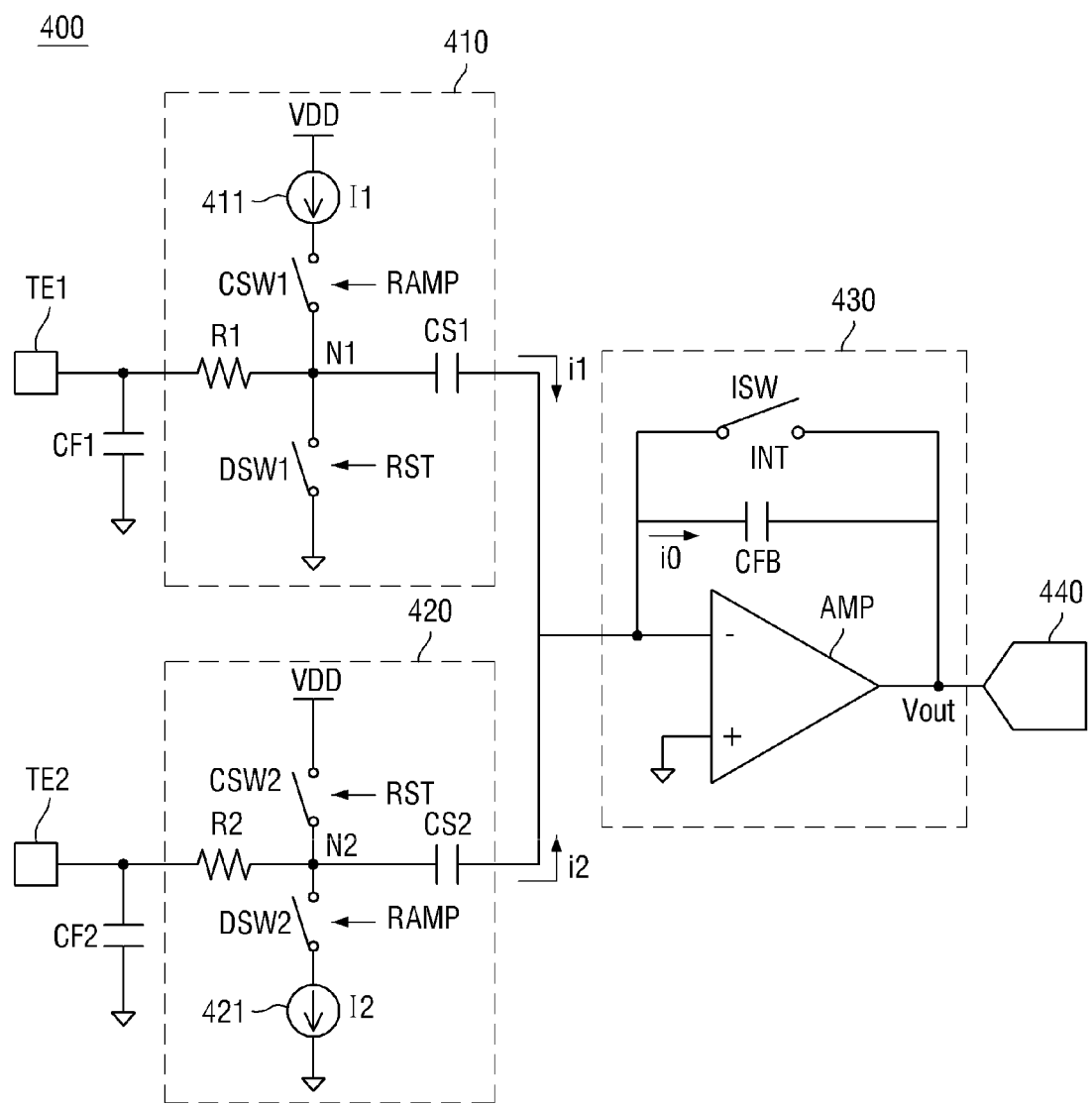
FIG. 8 is a circuit diagram showing an embodiment of the touch driving circuit of FIG. 7.
Figure 9:
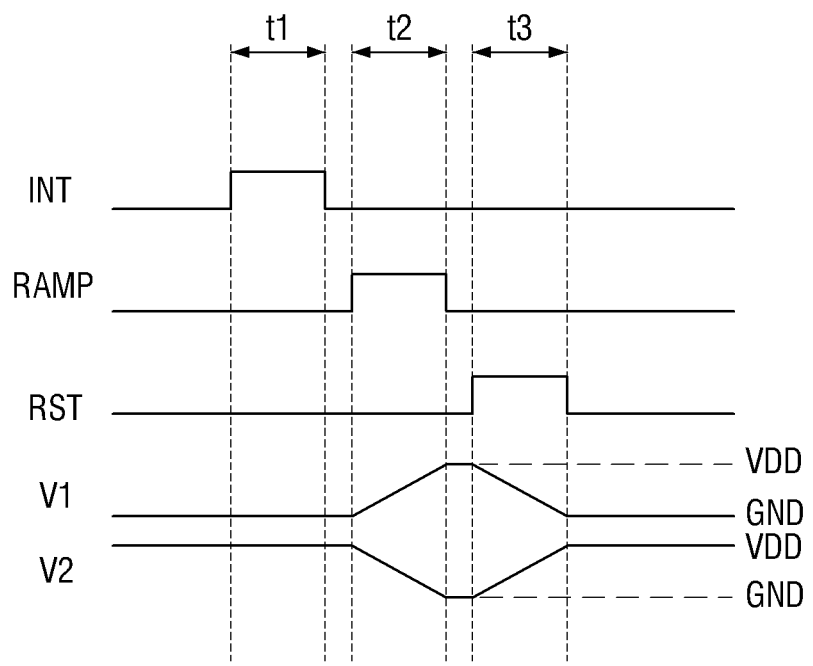
FIG. 9 is a waveform diagram illustrating signals supplied to the touch driving circuit of FIG. 8.

FIG. 8 is a circuit diagram showing an embodiment of the touch driving circuit of FIG. 7, and FIG. 9 is a waveform diagram illustrating signals supplied to the touch driving circuit of FIG. 8.

Referring to FIGS. 8 and 9, the touch driving circuit 400 may include a first sensing driver 410, a second sensing driver 420, a touch sensing unit (e.g., a touch sensor or a touch sensing part) 430, and an analog-digital converter 440.

The first sensing driver 410 may include a first current source 411, a first charging switch CSW1, a first discharging switch DSW1, and a first sensing capacitor CS1.

When the first charging switch CSW1 is turned on, the first current source 411 may charge a first node N1 that is connected to (or that corresponds to) one end of the first sensing capacitor CS1. Here, the first node N1 may be connected to a first touch electrode TE1 through the touch electrode line TEL, as shown in FIG. 7. In this case, each of the plurality of touch electrode lines TEL may have its own resistance R1 according to a material, a cross-sectional area, and/or a length of the line or wiring. When a touch driving voltage VDD is supplied to the first node N1, a capacitance CF1 may be generated between the first touch electrode TE1 and the electrode, driving line, and/or signal line of the display unit DU. When a user's touch occurs on (e.g., is received at) the first touch electrode TE1, an additional capacitance may be generated between the first touch electrode TE1 and the user's touch (e.g., the user's finger, the pen, and/or the like), thereby changing the capacitance CF1 of the first touch electrode TE1.

The first current source 411 may be connected between the touch driving voltage source VDD and the first charging switch CSW1, and the first charging switch CSW1 may be connected between the first current source 411 and the first node N1. In more detail, the first charging switch CSW1 may be turned on during a second period t2 to connect (e.g., to selectively connect) the first current source 411 and the first node N1 to each other. For example, the first charging switch CSW1 may be turned on according to (e.g., based on) a ramp signal RAMP having a turn-on level (e.g., a high level) during the second period t2 to charge the first node N1. Accordingly, when the first charging switch CSW1 is turned on, the first current source 411 may charge the first node N1 by supplying a suitable current (e.g., a predetermined current) I1 to the first node N1.

The first discharging switch DSW1 may be disposed between the first node N1 and the ground power source. In more detail, the first discharging switch DSW1 may be turned on during a third period t3 to connect (e.g., to selectively connect) the first node N1 and the ground power source to each other. For example, the first discharging switch DSW1 may be turned on based on a reset signal RST having a turn-on level (e.g., a high level) during the third period t3 to discharge the first node N1. As shown in FIG. 9, a rising edge of the reset signal RST may occur after (or immediately after) a falling edge of the ramp signal RAMP. As such, after the first node N1 is charged by the first current source 411, the first discharging switch DSW1 may discharge the first node N1 according to (e.g., based on) the reset signal RST.

One end of the first sensing capacitor CS1 may be connected to the first node N1, and the other end of the first sensing capacitor CS1 may be connected to a first input terminal (−) of an operational amplifier AMP of the touch sensing unit 430. Accordingly, when a desired or suitable voltage (e.g., a predetermined voltage) is charged in the first node N1, a capacitance may be formed at ends (e.g., at both ends) of the first sensing capacitor CS1. The capacitance formed in the first sensing capacitor CS1 may be sensed by the touch sensing unit 430.

The second sensing driver 420 may include a second charge switch CSW2, a second current source 421, a second discharge switch DSW2, and a second sensing capacitor CS2.

The second charging switch CSW2 may be disposed between a touch driving voltage source VDD and a second node N2. Here, the second node N2 may be connected to a second touch electrode TE2 through the touch electrode line TEL, as shown in FIG. 7. For example, the second touch electrode TE2 may be disposed adjacent to the first touch electrode TE1, and may be insulated from the first touch electrode TE1. As another example, the second touch electrode TE2 may be disposed to be spaced apart from the first touch electrode TE1 with a plurality of touch electrodes interposed therebetween. Each of the plurality of touch electrode lines TEL may have its own resistance R2 according to (e.g., depending on) a material, a cross-sectional area, and/or a length of the line or wiring. When the touch driving voltage VDD is supplied to the second node N2, a capacitance CF2 may be generated between the second touch electrode TE2 and the electrode, driving line, and/or signal line of the display unit DU. When a user's touch occurs on (e.g., is received at) the second touch electrode TE2, an additional capacitance may be generated between the first touch electrode TE1 and the user's touch (e.g., the user's finger, the pen, and/or the like), thereby changing the capacitance CF2 of the second touch electrode TE2.

For example, the first touch electrode TE1 may be a touch electrode disposed at (e.g., in or on) an odd row from among the plurality of touch electrodes TE shown in FIG. 7, and the second touch electrode TE2 may be a touch electrode disposed at (e.g., in or on) an even row from among the plurality of touch electrodes TE shown in FIG. 7. As another example, the first touch electrode TE1 may be a touch electrode disposed at (e.g., in or on) an odd column from among the plurality of touch electrodes TE shown in FIG. 7, and the second touch electrode TE2 may be a touch electrode disposed at (e.g., in or on) an even column from among the plurality of touch electrodes TE shown in FIG. 7.

As another example, the first touch electrodes TE1 may be touch electrodes disposed at (e.g., in or on) some columns or some rows from among the plurality of touch electrodes TE shown in FIG. 7, and the second touch electrodes TE2 may be touch electrodes disposed at (e.g., in or on) some other columns or some other rows from among the plurality of touch electrodes TE. The touch electrodes disposed at (e.g., in or on) the remaining columns or the remaining rows from among the plurality of touch electrodes TE may be connected to the touch sensing unit 430 one-to-one.

The second charging switch CSW2 may be turned on during a third period t3 to connect (e.g., to selectively connect) the touch driving voltage source VDD and the second node N2 to each other. For example, the second charging switch CSW2 may be turned on according to (e.g., based on) the reset signal RST, to supply the touch driving voltage VDD to the second node N2 that is connected to (or that corresponds to) one end of the second sensing capacitor CS2. As shown in FIG. 9, a rising edge of the reset signal RST may occur after (or immediately after) a falling edge of the ramp signal RAMP. As such, the first node N1 may be charged during the second period t2 (or when the ramp signal RAMP has a high level), and the second node N2 may be charged during the third period t3 (or when the reset signal RST has a high level). Therefore, the charging timings of the first node N1 and the second node N2 may be different from each other. In other words, the charging timings of the first sensing capacitor CS1 and the second sensing capacitor CS2 may be different from each other.

The second current source 421 may be connected between the second discharging switch DSW2 and the ground power source, and the second discharging switch DSW2 may be connected between the second node N2 and the second current source 421. In more detail, the second discharging switch DSW2 may be turned on during the second period t2 to connect (e.g., to selectively connect) the second node N2 and the second current source 421 to each other. For example, the second discharging switch DSW2 may be turned on according to (e.g., based on) the ramp signal RAMP having a turn-on level (e.g., a high level) during the second period t2, to discharge the second node N2 that is connected to (or that corresponds to) one end of the second sensing capacitor CS2. Accordingly, when the second discharge switch DSW2 is turned on, the second current source 421 may discharge the second node N2 by drawing a desired or suitable current (e.g., a predetermined current) I2 from the second node N2.

As such, the second node N2 may be discharged during the second period t2 (or when the ramp signal RAMP has a high level), and the first node N1 may be discharged during the third period t3 (or when the reset signal RST has a high level). Therefore, the discharging timings of the first node N1 and the second node N2 may be different from each other. In other words, the discharging timings of the first sensing capacitor CS1 and the second sensing capacitor CS2 may be different from each other.

One end of the second sensing capacitor CS2 may be connected to the second node N2, and the other end of the second sensing capacitor CS2 may be connected to the first input terminal (−) of the operational amplifier AMP of the touch sensing unit 430. Accordingly, when a desired or suitable voltage (e.g., a predetermined voltage) is charged in the second node N2, a capacitance may be formed at ends (e.g., at both ends) of the second sensing capacitor CS2. The capacitance formed in the second sensing capacitor CS2 may be sensed by the touch sensing unit 430.

The touch sensing unit 430 may include the operational amplifier AMP, a feedback capacitor CFB, and an initialization switch ISW.

The operational amplifier AMP may include the first input terminal (−), a second input terminal (+), and an output terminal. The first input terminal (−) of the operational amplifier AMP may be connected to the other end of each of the first and second sensing capacitors CS1 and CS2, and the second input terminal (+) of the operational amplifier AMP may be connected to the ground power source. Further, the output terminal of the operational amplifier AMP may be connected to the analog-digital converter 440 to supply an output voltage Vout to the analog-digital converter 440.

The feedback capacitor CFB may be connected between the first input terminal (−) and output terminal of the operational amplifier AMP. Accordingly, the feedback capacitor CFB may generate a potential difference (e.g., a voltage difference) between the output terminal and first input terminal (−) of the operational amplifier AMP, and may store a charge.

According to an embodiment, the feedback capacitor CFB may determine gains of the first or second sensing capacitors CS1 and CS2 and the operational amplifier AMP. In more detail, the first node N1, which is connected to (or which corresponds to) one end of the first sensing capacitor CS1, may be charged during the second period t2, and the second node N2, which is connected to (or which corresponds to) one end of the second sensing capacitor CS2, may be discharged during the second period t2. As such, when the touch driving voltage VDD is charged in the first node N1 and the second node N2 is discharged during the second period t2, the gain of the operational amplifier AMP may correspond to CS1/CFB (e.g., Gain (t2)=CS1/CFB).

Similarly, the first node N1, which is connected to (or which corresponds to) one end of the first sensing capacitor CS1, may be discharged during the third period t3, and the second node N2, which is connected to (or which corresponds to) one end of the second sensing capacitor CS2, may be charged during the third period t3. As such, when the touch driving voltage VDD is charged in the second node N2 and the first node N1 is discharged during the third period t3, the gain of the operational amplifier AMP may correspond to CS2/CFB (e.g., Gain (t3)=CS2/CFB). Therefore, the gain of the operational amplifier AMP may be determined by the feedback capacitor CFB and the first and second sensing capacitors CS1 and CS2.

According to an embodiment, the output voltage Vout of the operational amplifier AMP may be defined by Equations 1 and 2 below.

$$i_1(t) + i_2(t) = i_0(t) \qquad \text{Equation 1}$$

$$CS_1 \frac{dV_1(t)}{dt} + CS_2 \frac{dV_2(t)}{dt} = CFB \frac{dVout(t)}{dt} \qquad \text{Equation 2}$$

Here, "$i_1$" refers to a current flowing through the first sensing capacitor CS1, "$i_2$" refers to a current flowing through the second sensing capacitor CS2, and "$i_0$" refers to a current flowing through the feedback capacitor CFB. Further, "$V_1$" refers to a voltage charged in the first sensing capacitor CS1 or a voltage of the first node N1, "$V_2$" refers to a voltage charged in the second sensing capacitor CS2 or a voltage of the second node N2, and "Vout" refers to a voltage charged in the feedback capacitor CFB or the output voltage.

The amount of change in the voltage $V_1$ charged in the first sensing capacitor CS1, the amount of change in the voltage $V_2$ charged in the second sensing capacitor CS2, and the amount of change in the output voltage Vout are defined by Equations 3 to 5 below, respectively.

$$\frac{dV_1(t)}{dt} = \frac{V_1(t) - V_1(0)}{t} = \frac{\frac{I_1 \times t}{CF_1} - 0}{t} \qquad \text{Equation 3}$$

$$\frac{dV_2(t)}{dt} = \frac{V_2(t) - V_2(0)}{t} = \frac{\frac{I_2 \times t}{CF_2} - VDD}{t} \qquad \text{Equation 4}$$

$$\frac{dVout(t)}{dt} = \frac{Vout(t) - Vout(0)}{t} = \frac{Vout - VCM}{t} \qquad \text{Equation 5}$$

Here, "$I_1$" refers to a current supplied to the first node N1 by the first current source 411, "$I_2$" refers to a current drawn from the second node N2 by the second current source 421, and "VCM" refers to a voltage initialized by the initialization switch ISW that is turned on by the output voltage Vout.

When substituting each of Equations 3 to 5 into respective terms of Equation 2, Equation 6 may be derived as below.

$$Vout = VCM + \frac{t}{CFB} \left[ CS_1 \frac{\frac{I_1 \times t}{CF_1}}{t} + CS_2 \frac{\frac{I_2 \times t}{CF_2} - VDD}{t} \right] \qquad \text{Equation 6}$$

When summarizing Equation 6, Equation 7 may be derived as below.

$$Vout = VCM + \frac{t}{CFB} \left[ CS_1 \frac{I_1}{CF_1} + CS_2 \left( \frac{I_2}{CF_2} - \frac{VDD}{t} \right) \right] \qquad \text{Equation 7}$$

As described above, the output voltage Vout may be determined according to (e.g., by) the initialized output voltage VCM, the feedback capacitor CFB, the first sensing capacitor CS1, the capacitance CF1 formed in the first touch electrode TE1, the first current source 411, the second sensing capacitor CS2, the capacitance CF2 formed in the second touch electrode TE2, the second current source 421, and the touch driving voltage VDD.

The initialization switch ISW may be connected between the first input terminal (−) and output terminal of the operational amplifier AMP. In other words, the initialization switch ISW may be connected in parallel to the feedback capacitor CFB. In more detail, the initialization switch ISW may be turned on during a first period t1 to initialize the output voltage Vout of the operational amplifier AMP. For example, the initialization switch ISW may be turned on according to (e.g., based on) an initialization signal INT having a turn-on level (e.g., a high level) during the first period t1 to initialize the output voltage Vout. In FIG. 9, the first period t1 may correspond to a period before the second period t2, and may further correspond to a period that occurs after the third period t3 has passed.

The analog-digital converter 440 may receive the output voltage Vout of the touch sensing unit 430, and may convert the output voltage Vout into touch data (e.g., touch raw data) that is digital data. The touch driving circuit 400 may determine the occurrence of a user's touch and the position of the user's touch according to (e.g., based on) the touch raw data.

Therefore, the touch driving circuit 400 according to an embodiment may sense a user's touch occurring in (e.g., received at) the plurality of touch electrodes TE1 and TE2 through one terminal or through one input pin of the touch driving circuit 400. Accordingly, the touch driving circuit 400 may reduce the number of receiving terminals or input pins, and may reduce the area of the touch driving circuit 400 mounted on the circuit board 300. As a result, the touch driving circuit 400 according to an embodiment may reduce manufacturing costs of the touch driving circuit 400, and may provide a compact circuit design.

Figure 10:
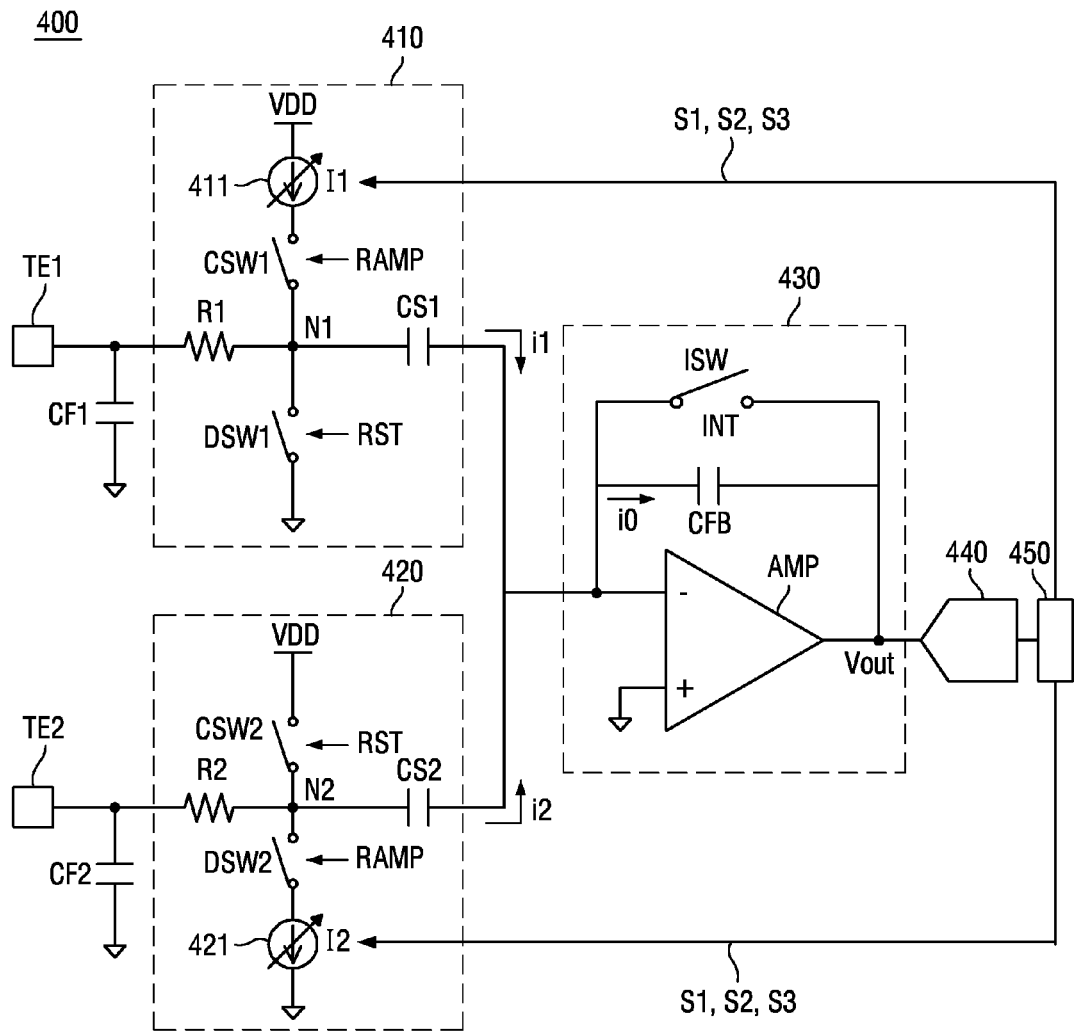
FIG. 10 is a circuit diagram showing an embodiment of the touch driving circuit of FIG. 7.
Figure 11:
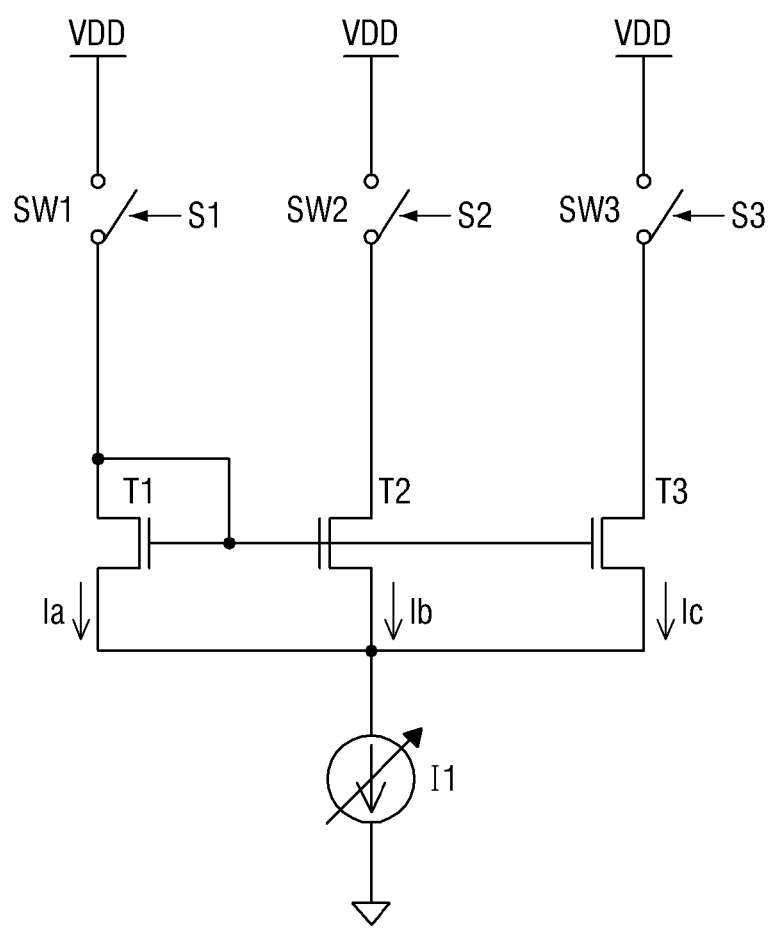
FIG. 11 is an exemplary diagram of first and second current sources of the touch driving circuit of FIG. 10.

FIG. 10 is a circuit diagram showing an embodiment of the touch driving circuit of FIG. 7, and FIG. 11 is an exemplary diagram of first and second current sources of the touch driving circuit of FIG. 10. A touch driving circuit 400 according to the embodiment shown in FIG. 10 may be different from the touch driving circuit 400 according to the embodiment shown in FIG. 8, in that the touch driving circuit 400 of FIG. 10 may further include a deviation compensator 450. Therefore, redundant description of the same or substantially the same elements and configurations as those described with reference to the embodiment of FIG. 8 may be simplified or may not be repeated.

Referring to FIGS. 10 and 11, the touch driving circuit 400 according to the present embodiment may further include the deviation compensator 450.

The deviation compensator 450 may receive the touch raw data from the analog-digital converter 440. The deviation compensator 450 may compare a first output of the touch sensing unit 430 with respect to the first touch electrode TE1 and a second output of the touch sensing unit 430 with respect to the second touch electrode TE2 to compensate for a deviation (e.g., a variation) between the first and second outputs.

In more detail, the touch sensing unit 430 may sense a voltage charged in the first sensing capacitor CS1 during the second period t2 in which the ramp signal RAMP has a turn-on level (e.g., a high level), and may sense a voltage charged in the second sensing capacitor CS2 during the third period t3 in which the reset signal RST has a turn-on level (e.g., a high level). Each of the output voltage Vout of the first touch electrode TE1 and the output voltage Vout of the second touch electrode TE2 of the touch sensing unit 430 may be converted into the touch raw data by the analog-digital converter 440, and the deviation compensator 450 may determine whether there is a deviation (e.g., a variation) between the touch raw data. If there is a deviation (e.g., a variation) between the plurality of touch raw data, the deviation compensator 450 may improve the touch sensitivity of the touch driving circuit 400 by compensating for the deviation (e.g., the variation).

For example, the deviation compensator 450 may change the size (or the amount) of the current I1 of the first current source 411 that is used to charge the first node N1, and/or may change the size (or the amount) of the current I2 of the second current source 421 that is used to discharge the second node N2, thereby compensating for the deviation (e.g., the variation) between the first and second outputs of the touch sensing unit 430.

Each of the first and second current sources 411 and 421 may include a current mirror including at least two transistors having gate terminals that are connected to each other.

As shown in FIG. 11, the first current source 411 may include first to third transistors T1, T2, and T3 having gate terminals that are connected to each other, and first to third switches SW1, SW2, and SW3 connected between the touch driving voltage source VDD and the first to third transistors T1, T2, and T3, respectively.

According to an embodiment, the deviation compensator 450 may supply at least one of first to third signals S1, S2, and S3 to the first current source 411. For example, when the deviation compensator 450 supplies the first or second signals S1 or S2 to each of the first and second switches SW1 and SW2, the touch driving voltage VDD may be supplied to a drain terminal of each of the first and second transistors T1 and T2, and drain-source currents Ia and Ib of the first and second transistors T1 and T2 may flow. Accordingly, the size of the current I1 of the first current source 411 may correspond to a sum of the drain-source currents Ia and Ib of the first and second transistors T1 and T2 (e.g., I1=Ia+Ib).

As another example, when the deviation compensator 450 supplies the first to third signals S1, S2, and S3 to the first to third switches SW1, SW2, and SW3, respectively, the touch driving voltage VDD may be supplied to the drain terminal of each of the first to third transistors T1, T2, and T3, and drain-source currents Ia, Ib, and Ic of the first to third transistors T1, T2, and T3 may flow. Accordingly, the size of the current I1 of the first current source 411 may correspond to the sum of the drain-source currents Ia, Ib, and Ic of the first to third transistors T1, T2, and T3 (e.g., I1=Ia+Ib+Ic).

As described above, the deviation compensator 450 may control the sizes (e.g., the amounts) of the currents I1 and I2 of the first and/or second current sources 411 and 421 according to the comparison result of the plurality of touch raw data. For example, according to Equation 7 above, the deviation compensator 450 may control the sizes of the currents I1 and I2 of the first and second current sources 411 and 421, thereby compensating for a deviation (e.g., a variation) between the output voltage Vout of the first touch electrode TE1 and the output voltage Vout of the second touch electrode TE2. As a result, the touch driving circuit 400 according to an embodiment may detect (e.g., may easily detect) a small capacitance change caused by the user's touch, thereby improving touch sensitivity and ensuring reliability.

Figure 12:
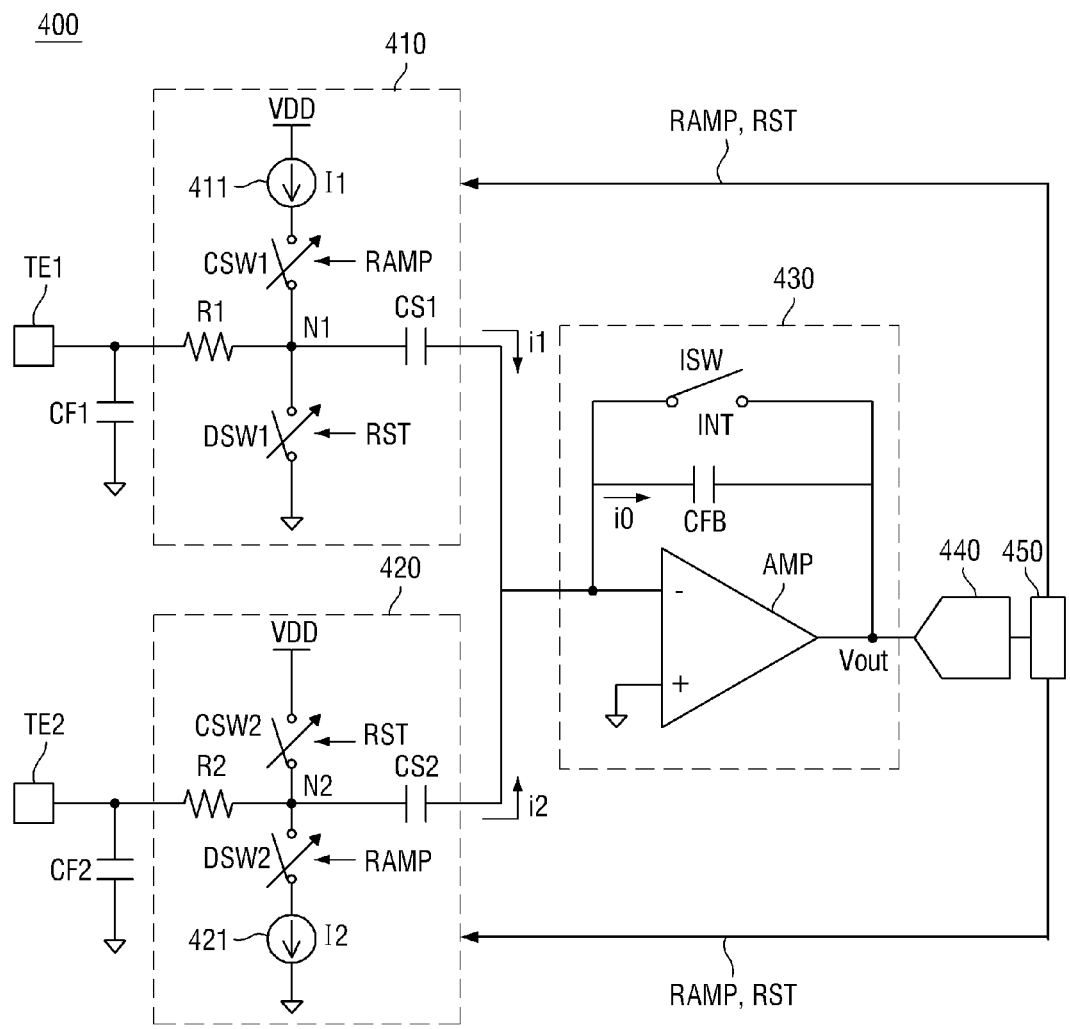
FIG. 12 is a circuit diagram showing an embodiment of the touch driving circuit of FIG. 7.
Figure 13:
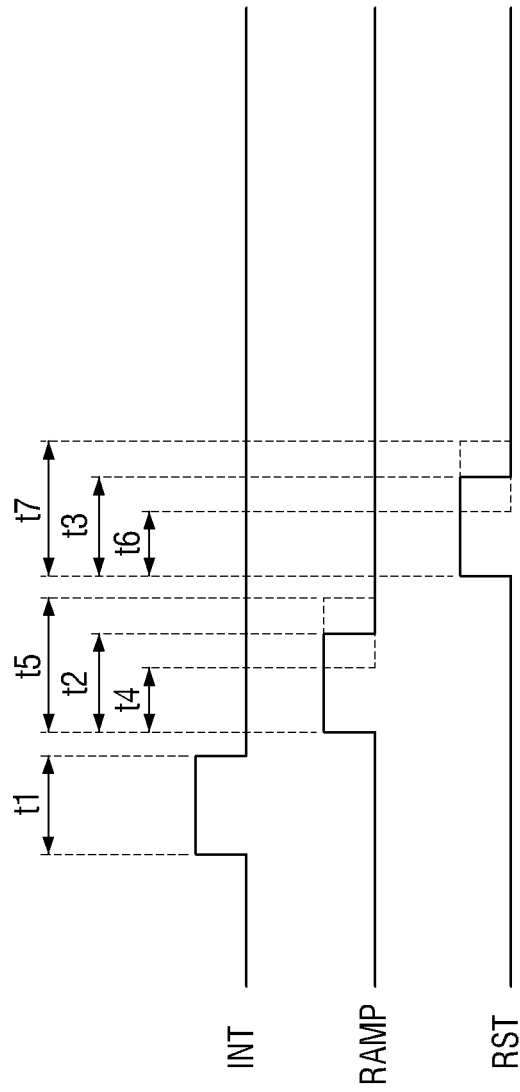
FIG. 13 is a waveform diagram illustrating signals supplied to the touch driving circuit of FIG. 12.

FIG. 12 is a circuit diagram showing an embodiment of the touch driving circuit of FIG. 7, and FIG. 13 is a waveform diagram illustrating signals supplied to the touch driving circuit of FIG. 12. A touch driving circuit 400 according to the embodiment of FIG. 12 may be different from the touch driving circuit 400 according to the embodiment of FIG. 10, in that the configuration of the deviation compensator 450 of the touch driving circuit 400 according to the embodiment of FIG. 12 may be different from that of the deviation compensator 450 of the touch driving circuit 400 according to the embodiment of FIG. 10. Therefore, redundant description of the same or substantially the same elements and configurations as those described with reference to one or more of the embodiments described above may be simplified or may not be repeated.

Referring to FIGS. 12 and 13, the deviation compensator 450 may receive touch raw data from the analog-digital converter 440. The deviation compensator 450 may compare a first output of the touch sensing unit 430 with respect to the first touch electrode TE1 and a second output of the touch sensing unit 430 with respect to the second touch electrode TE2 to compensate for a deviation (e.g., a variation) between the first and second outputs.

In more detail, the touch sensing unit 430 may sense a voltage charged in the first sensing capacitor CS1 during the second period t2 in which the ramp signal RAMP has a turn-on level (e.g., a high level), and may sense a voltage charged in the second sensing capacitor CS2 during the third period t3 in which the reset signal RST has a turn-one level (e.g., a high level). Each of the output voltage Vout of the first touch electrode TE1 and the output voltage Vout of the second touch electrode TE2 of the touch sensing unit 430 may be converted into the touch raw data by the analog-digital converter 440, and the deviation compensator 450 may determine whether there is a deviation (e.g., a variation) between the touch raw data. If there is a deviation (e.g., a variation) between the plurality of touch raw data, the deviation compensator 450 may improve the touch sensitivity of the touch driving circuit 400 by compensating for the deviation (e.g., the variation).

According to an embodiment, the deviation compensator 450 may change the turn-on time of each of the first and second charging switches CSW1 and CSW2 and the first and second discharging switches DSW1 and DSW2, thereby compensating for the deviation (e.g., the variation) between the first and second outputs of the touch sensing unit 430.

As shown in FIG. 13, the deviation compensator 450 may control the turn-on time of the ramp signal RAMP supplied to each of the first charging switch CSW1 and the second discharging switch DSW2. For example, the deviation compensator 450 may supply the ramp signal RAMP having a turn-on level (e.g., a high level) during a fourth period t4 that is shorter than the second period t2 to reduce the turn-on time of each of the first charging switch CSW1 and the second discharging switch DSW2. In this case, the time for the first current source 411 to charge the first node N1 may be shortened, and the time for the second current source 421 to discharge the second node N2 may be shortened.

As another example, the deviation compensator 450 may supply the ramp signal RAMP having a turn-on level (e.g., a high level) during a fifth period t5 that is longer than the second period t2 to increase the turn-on time of each of the first charging switch CSW1 and the second discharging switch DSW2. In this case, the time for the first current source 411 to charge the first node N1 may be increased, and the time for the second current source 421 to discharge the second node N2 may be increased.

Further, for example, the deviation compensator 450 may supply the reset signal RST having a turn-on level (e.g., a high level) during a sixth period t6 that is shorter than the third period t3 to reduce the turn-on time of each of the first discharging switch DSW1 and the second charging switch CSW2. In this case, the discharge time of the first node N1 may be shortened, and the time for the touch driving voltage VDD to be supplied to the second node N2 may be shortened.

In another example, the deviation compensator 450 may supply the reset signal RST having a turn-on level (e.g., a high level) during a seventh period t7 that is longer than the third period t3 to increase the turn-on time of each of the first discharging switch DSW1 and the second charging switch CSW2. In this case, the discharge time of the first node N1 may be increased, and the time for the touch driving voltage VDD to be supplied to the second node N2 may be increased.

As described above, the deviation compensator 450 may control the turn-on time of each of the first and second charging switches CSW1 and CSW2 and the first and second discharging switches DSW1 and DSW2 according to the comparison result of the plurality of touch raw data. For example, according to Equation 7 above, the deviation compensator 450 may control the turn-on time of each of the plurality of switches, thereby compensating for a deviation (e.g., a variation) between the output voltage Vout of the first touch electrode TE1 and the output voltage Vout of the second touch electrode TE2. As a result, the touch driving circuit 400 according to an embodiment may detect (e.g., may easily detect) a small capacitance change caused by the user's touch, thereby improving touch sensitivity and ensuring reliability.

Figure 14:
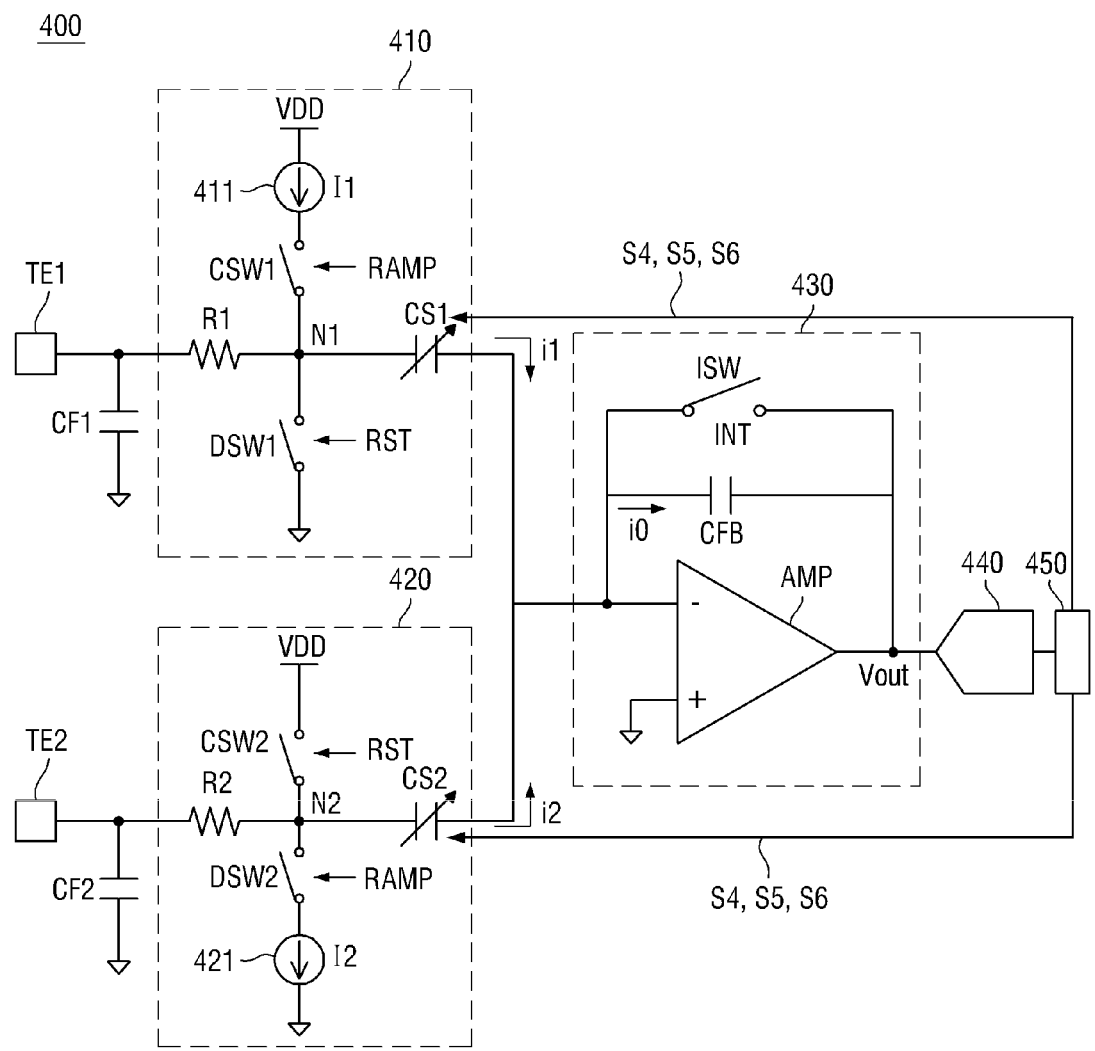
FIG. 14 is a circuit diagram showing an embodiment of the touch driving circuit of FIG. 7.
Figure 15:
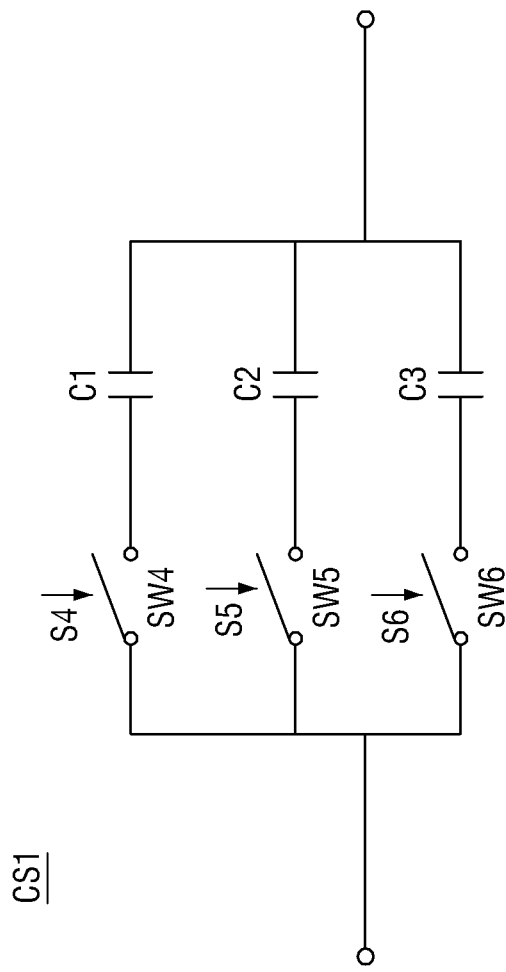
FIG. 15 is an exemplary diagram of first and second sensing capacitors of the touch driving circuit of FIG. 14.

FIG. 14 is a circuit diagram showing an embodiment of the touch driving circuit of FIG. 7, and FIG. 15 is an exemplary diagram of first and second sensing capacitors of the touch driving circuit of FIG. 14. A touch driving circuit 400 according to the embodiment of FIG. 14 may be different from the touch driving circuit 400 according to one or more of the embodiments of FIGS. 10 and 12, in that the configuration of the deviation compensator 450 of the touch driving circuit 400 according to the embodiment of FIG. 14 may be different from those of the deviation compensators 450 of the touch driving circuit 400 according to the embodiments of FIGS. 10 and 12. Therefore, redundant description of the same or substantially the same elements and configurations as those described with reference to one or more of the embodiments described above may be simplified or may not be repeated.

Referring to FIGS. 14 and 15, the deviation compensator 450 may receive touch raw data from the analog-digital converter 440. The deviation compensator 450 may compare a first output of the touch sensing unit 430 with respect to the first touch electrode TE1 and a second output of the touch sensing unit 430 with respect to the second touch electrode TE2 to compensate for a deviation (e.g., a variation) between the first and second outputs.

In more detail, the touch sensing unit 430 may sense a voltage charged in the first sensing capacitor CS1 during the second period t2 in which the ramp signal RAMP has a turn-on level (e.g., a high level), and may sense a voltage charged in the second sensing capacitor CS2 during the third period t3 in which the reset signal RST has a turn-on level (e.g., a high level). Each of the output voltage Vout of the first touch electrode TE1 and the output voltage Vout of the second touch electrode TE2 of the touch sensing unit 430 may be converted into the touch raw data by the analog-digital converter 440, and the deviation compensator 450 may determine whether there is a deviation (e.g., a variation) between the touch raw data. If there is a deviation (e.g., a variation) between the plurality of touch raw data, the deviation compensator 450 may improve the touch sensitivity of the touch driving circuit 400 by compensating for the deviation (e.g., the variation).

According to an embodiment, the deviation compensator 450 may change the capacitance of each of the first and second sensing capacitors CS1 and CS2, thereby compensating for the deviation (e.g., the variation) between the first and second outputs of the touch sensing unit 430.

Each of the first and second sensing capacitors CS1 and CS2 may include at least two capacitors connected in parallel with each other.

As shown in FIG. 15, the first sensing capacitor CS1 may include first to third capacitors C1, C2, and C3 connected in parallel to each other, and fourth to sixth switches SW4, SW5, and SW6 connected in series to the first to third capacitors C1, C2, and C3, respectively.

According to an embodiment, the deviation compensator 450 may supply at least one of fourth to sixth signals S4, S5, and S6 to the first sensing capacitor CS1. For example, when the deviation compensator 450 supplies the fourth or fifth signal S4 or S5 to each of the fourth and fifth switches SW4 and SW5, the equivalent capacitance of the first sensing capacitor CS1 may correspond to the sum of capacitances of the first and second capacitors C1 and C2 (e.g., CS1=C1+C2).

As another example, when the deviation compensator 450 supplies the fourth to sixth signals S4, S5, and S6 to the fourth to sixth switches SW4, SW5, and SW6, respectively, the equivalent capacitance of the first sensing capacitor CS1 may correspond to the sum of capacitances of the first to third capacitors C1, C2, and C3 (e.g., CS1=C1+C2+C3).

According to an embodiment, the feedback capacitor CFB may determine the gains of the first or second sensing capacitors CS1 and CS2 and the operational amplifier AMP. For example, the first node N1, which is connected to (or which corresponds to) one end of the first sensing capacitor CS1, may be charged during the second period t2, and the second node N2, which is connected to (or which corresponds to) one end of the second sensing capacitor CS2, may be discharged during the second period t2. As such, when the touch driving voltage VDD is charged in the first node N1 and the second node N2 is discharged, the gain of the operational amplifier AMP may correspond to CS1/CFB (e.g., Gain (t2)=CS1/CFB).

Further, the first node N1, which is connected to (or which corresponds to) one end of the first sensing capacitor CS1, may be discharged during the third period t3, and the second node N2, which is connected to (or which corresponds to) one end of the second sensing capacitor CS2, may be charged during the third period t3. As such, when the touch driving voltage VDD is charged in the second node N2 and the first node N1 is discharged, the gain of the operational amplifier AMP may correspond to CS2/CFB (e.g., Gain (t3)=CS2/CFB). Therefore, the gain of the operational amplifier AMP may be determined by the feedback capacitor CFB and the first and second sensing capacitors CS1 and CS2.

As described above, the deviation compensator 450 may control the capacitances of the first and second sensing capacitors CS1 and CS2 according to the comparison result of the plurality of touch raw data. For example, according to Equation 7 above, the deviation compensator 450 may control the capacitances of the first and second sensing capacitors CS1 and CS2, thereby compensating for a deviation (e.g., a variation) between the output voltage Vout of the first touch electrode TE1 and the output voltage Vout of the second touch electrode TE2. As a result, the touch driving circuit 400 according to an embodiment may detect (e.g., may easily detect) a small capacitance change caused by the user's touch, thereby improving touch sensitivity and ensuring reliability.

Figure 16:
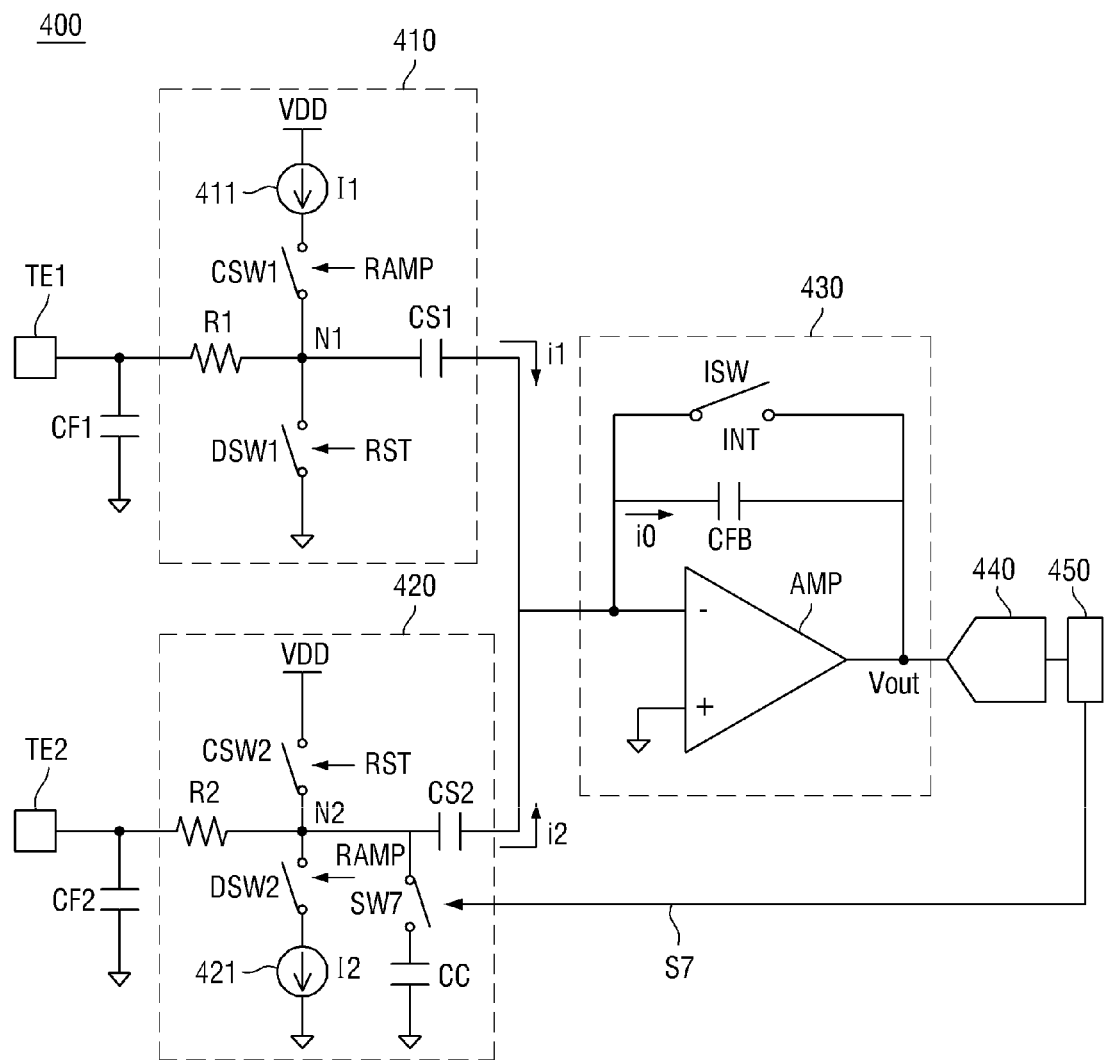
FIG. 16 is a circuit diagram showing an embodiment of the touch driving circuit of FIG. 7.

FIG. 16 is a circuit diagram showing an embodiment of the touch driving circuit of FIG. 7. A touch driving circuit 400 according to the embodiment of FIG. 16 may be different from the touch driving circuit 400 according to one or more of the embodiments of FIGS. 10, 12, and 14, in that the configurations of the second sensing driver 420 and the deviation compensator 450 of the touch driving circuit 400 according to the embodiment of FIG. 16 may be different from those of the second sensing driver 420 and the deviation compensator 450 of the touch driving circuit 400 according to the embodiments of FIGS. 10, 12, and 14. Therefore, redundant description of the same or substantially the same elements and configurations as those described with reference to one or more of the embodiments described above may be simplified or may not be repeated.

Referring to FIG. 16, the second sensing driver 420 may further include a seventh switch SW7 and a compensation capacitor CC. The seventh switch SW7 may be connected between the second node N2 and the compensation capacitor CC, and the compensation capacitor CC may be connected between the seventh switch SW7 and the ground power source. In other words, one end of the compensation capacitor CC may be selectively connected to the second node N2 by the seventh switch SW7, and the other end of the compensation capacitor CC may be connected to the ground power source. Therefore, the seventh switch SW7 may be turned on according to (e.g., based on) a seventh signal S7 supplied from the deviation compensator 450 to connect the one end of the compensation capacitor CC to the second node N2.

The deviation compensator 450 may receive touch raw data from the analog-digital converter 440. The deviation compensator 450 may compare a first output of the touch sensing unit 430 with respect to the first touch electrode TE1 and a second output of the touch sensing unit 430 with respect to the second touch electrode TE2 to compensate for a deviation (e.g., a variation) between the first and second outputs.

In more detail, the touch sensing unit 430 may sense a voltage charged in the first sensing capacitor CS1 during the second period t2 in which the ramp signal RAMP has a turn-on level (e.g., a high level), and may sense a voltage charged in the second sensing capacitor CS2 during the third period t3 in which the reset signal RST has a turn-on level (e.g., a high level). Each of the output voltage Vout of the first touch electrode TE1 and the output voltage Vout of the second touch electrode TE2 of the touch sensing unit 430 may be converted into the touch raw data by the analog-digital converter 440, and the deviation compensator 450 may determine whether there is a deviation (e.g., a variation) between the touch raw data. If there is a deviation (e.g., a variation) between the plurality of touch raw data, the deviation compensator 450 may improve the touch sensitivity of the touch driving circuit 400 by compensating for the deviation (e.g., the variation).

According to an embodiment, the deviation compensator 450 may compensate for the deviation (e.g., the variation) between the first and second outputs of the touch sensing unit 430 by selectively connecting the one end of the compensation capacitor CC to the second node N2. For example, when the one end of the compensation capacitor CC is connected to the second node N2, the compensation capacitor CC may be connected in parallel with the capacitance CF2 formed in the second touch electrode TE2. Therefore, Equation 7 above may be modified to (e.g., changed to) Equation 8 below.

$$Vout = VCM + \frac{t}{CFB}\left[CS_1 \frac{I_1}{CF_1} + CS_2\left(\frac{I_2}{CF_2 + CC} - \frac{VDD}{t}\right)\right] \quad \text{Equation 8}$$

As described above, the deviation compensator 450 may selectively connect one end of the compensation capacitor CC to the second node N2 according to the comparison result of the plurality of touch raw data, thereby compensating for the deviation (e.g., the variation) between the output voltage Vout of the first touch electrode TE1 and the output voltage Vout of the second touch electrode TE2. As a result, the touch driving circuit 400 according to an embodiment may detect (e.g., may easily detect) a small capacitance change caused by the user's touch, thereby improving touch sensitivity and ensuring reliability.

According to one or more embodiments of the present disclosure of the touch driving circuit and the display device including the touch driving circuit, a user's touch performed in (e.g., received on or at) a plurality of touch electrodes may be sensed through one terminal of the touch driving circuit. Thus, the number of receiving terminals of the touch driving circuit may be reduced, and thus, the area of the touch driving circuit mounted at (e.g., in or on) a circuit board may be reduced. As a result, the manufacturing costs of the touch driving circuit may be reduced, and a compact design may be realized.

Further, according to one or more embodiments of the present disclosure of the touch driving circuit and the display device including the touch driving circuit, the output voltages of touch sensing units with respect to each of a plurality of touch electrodes may be matched, thereby enabling detection (e.g., enabling easy detection) of a small capacitance change caused by the user's touch. Further, according to one or more embodiments of the present disclosure of the touch driving circuit and the display device including the touch driving circuit, the output voltages of touch sensing units with respect to each of a plurality of touch electrodes may be matched, thereby realizing a compact circuit design by sharing the receiving terminals or the receiving pins connected to the plurality of touch electrodes.

While various aspects and features of example embodiments of the present invention are described herein, the present invention is not limited by the foregoing, and various other aspects and features are anticipated herein.

Although various example embodiments of the present invention have been disclosed for illustrative purposes, those skilled in the art will appreciate that various modifications, additions, and/or substitutions may be possible to the various embodiments, all without departing from the spirit and scope of the present invention as disclosed in the accompanying claims, and their equivalents.

What is claimed is:

1. A touch driving circuit, comprising: a first sensing driver comprising a first sensing capacitor connected to a first touch electrode; a second sensing driver comprising a second sensing capacitor connected to a second touch electrode; and a touch sensor connected to the first and second sensing drivers to sense a voltage charged in each of the first and second sensing capacitors, wherein a charging time point of the first sensing capacitor is different from a charging time point of the second sensing capacitor, and a discharging time point of the first sensing capacitor is different from a discharging time point of the second sensing capacitor, wherein the charging time point of the first sensing capacitor is the same as the discharging time point of the second sensing capacitor, and wherein the first sensing capacitor is to be discharged according to a reset signal, and the second sensing capacitor is to be discharged according to a ramp signal.

2. The touch driving circuit of claim 1, wherein the touch sensor comprises:
an operational amplifier comprising a first input terminal connected to one end of each of the first and second sensing capacitors, a second input terminal that is grounded, and an output terminal;
a feedback capacitor connected between the first input terminal and the output terminal; and
an initialization switch connected between the first input terminal and the output terminal.

3. The touch driving circuit of claim 2,
wherein the initialization switch is to be turned on during an initialization period to initialize the output terminal of the operational amplifier.

4. The touch driving circuit of claim 1, wherein the first sensing driver further comprises:
a first current source to charge a first node connected to an end of the first sensing capacitor; and
a first charging switch to selectively connect the first current source and the first node to each other according to the ramp signal.

5. The touch driving circuit of claim 4,
wherein the first sensing driver further comprises a first discharging switch to discharge the first node according to the reset signal.

6. The touch driving circuit of claim 1,
wherein the second sensing driver further comprises a second charging switch to selectively supply a touch driving voltage to a second node connected to an end of the second sensing capacitor according to the reset signal.

7. The touch driving circuit of claim 6, wherein the second sensing driver further comprises:
a second current source to discharge the second node; and
a second discharging switch to selectively connect the second node and the second current source to each other according to the ramp signal.

8. The touch driving circuit of claim 1, further comprising:
an analog-digital converter to convert an output voltage of the touch sensor into touch raw data corresponding to digital data.

9. The touch driving circuit of claim 1,
wherein the discharging time point of the first sensing capacitor is the same as the charging time point of the second sensing capacitor.

10. The touch driving circuit of claim 1,
wherein the first sensing capacitor is to be charged according to the ramp signal, and the second sensing capacitor is to be charged according to the reset signal.

11. A touch driving circuit, comprising:
a first sensing driver comprising a first sensing capacitor connected to a first touch electrode;
a second sensing driver comprising a second sensing capacitor connected to a second touch electrode; and
a touch sensor connected to the first and second sensing drivers to sense a voltage charged in each of the first and second sensing capacitors,
wherein a charging time point of the first sensing capacitor is different from a charging time point of the second sensing capacitor, and a discharging time point of the first sensing capacitor is different from a discharging time point of the second sensing capacitor,
wherein the first sensing capacitor is to be charged according to a ramp signal, and the second sensing capacitor is to be charged according to a reset signal, and
wherein the first sensing capacitor is to be discharged according to the reset signal, and the second sensing capacitor is to be discharged according to the ramp signal.

12. A touch driving circuit, comprising:
a first sensing driver comprising a first sensing capacitor connected to a first touch electrode, the first sensing capacitor to be charged during a first period;
a second sensing driver comprising a second sensing capacitor connected to a second touch electrode, the second sensing capacitor to be charged during a second period subsequent to the first period;
a touch sensor connected to the first and second sensing drivers to sense a voltage charged in each of the first and second sensing capacitors; and
a deviation compensator to compare a first output of the touch sensor that is output during the first period with a second output of the touch sensor that is output during the second period to compensate for a deviation between the first output and the second output.

13. The touch driving circuit of claim 12, wherein the first sensing driver further comprises:

a first current source to charge a first node connected to the first sensing capacitor;

a first charging switch to connect the first current source and the first node to each other during the first period; and a first discharging switch to discharge the first node during the second period.

14. The touch driving circuit of claim 13, wherein the second sensing driver further comprises:

a second charging switch to supply a touch driving voltage to a second node connected to the second sensing capacitor during the second period;

a second current source to discharge the second node; and a second discharging switch to connect the second node and the second current source to each other during the first period.

15. The touch driving circuit of claim 14, wherein the deviation compensator is to change a size of each of the first and second current sources when the first and second outputs are different from each other.

16. The touch driving circuit of claim 15, wherein each of the first and second current sources comprises a current mirror comprising at least two transistors having gate terminals connected to each other.

17. The touch driving circuit of claim 14, wherein the deviation compensator is to change a turn-on time of each of the first and second charging switches and the first and second discharging switches when the first and second outputs are different from each other.

18. The touch driving circuit of claim 14, wherein the deviation compensator is to change a capacitance of each of the first and second sensing capacitors when the first and second outputs are different from each other.

19. The touch driving circuit of claim 18, wherein each of the first and second sensing capacitors comprises at least two capacitors connected in parallel to each other.

20. The touch driving circuit of claim 14, wherein the second sensing driver further comprises:

a compensation capacitor comprising one end selectively connected to the second node, and another end that is grounded; and a switch to selectively connect the compensation capacitor and the second node to each other.

21. The touch driving circuit of claim 20, wherein the deviation compensator is to turn on the switch when the first and second outputs are different from each other.

* * * * *